US012689739B2

(12) United States Patent
Xiang et al.

(10) Patent No.: US 12,689,739 B2
(45) Date of Patent: Jul. 21, 2026

(54) FINE-GRAINED INTRA PREDICTION FUSION

(71) Applicant: Tencent America LLC, Palo Alto, CA (US)

(72) Inventors: Ziyue Xiang, Palo Alto, CA (US); Biao Wang, San Jose, CA (US); Roman Chernyak, Santa Clara, CA (US); Yonguk Yoon, Palo Alto, CA (US); Lien-Fei Chen, Palo Alto, CA (US); Motong Xu, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/923,634

(22) Filed: Oct. 22, 2024

(65) Prior Publication Data
US 2025/0168358 A1 May 22, 2025

Related U.S. Application Data

(60) Provisional application No. 63/601,689, filed on Nov. 21, 2023.

(51) Int. Cl.
*H04N 19/159* (2014.01)
*H04N 19/119* (2014.01)
*H04N 19/176* (2014.01)

(52) U.S. Cl.
CPC ......... *H04N 19/159* (2014.11); *H04N 19/119* (2014.11); *H04N 19/176* (2014.11)

(58) Field of Classification Search
CPC .. H04N 19/159; H04N 19/119; H04N 19/176; H04N 19/105; H04N 19/11; H04N 19/593

See application file for complete search history.

(56) References Cited

U.S. PATENT DOCUMENTS

2018/0152713 A1* 5/2018 Jeong ..................... H04N 19/61
2019/0037213 A1* 1/2019 Hermansson ........ H04N 19/157
(Continued)

OTHER PUBLICATIONS

International Search Report and Written Opinion received for PCT Patent Application No. PCT/US2024/052743, mailed on Dec. 30, 2024, 12 pages.

*Primary Examiner* — Jared Walker
(74) *Attorney, Agent, or Firm* — ARENTFOX SCHIFF LLP

(57) ABSTRACT
Aspects of the disclosure includes methods and apparatuses for video decoding and encoding and a method of processing visual media data. The method for video decoding includes receiving coded information in a bitstream indicating that a current block is predicted based on a combination of a plurality of intra prediction modes. The method includes determining a plurality of intra predictions of the current block based on the respective intra prediction modes, determining a fused prediction of the current block based on a weighted summation of the plurality of intra predictions where the weighted summation is according to respective weights associated with the plurality of intra predictions, and reconstructing the current block based on the fused prediction. Each weight is based on one of a plurality of weighting functions that depends on a sample location (x, y) and the intra prediction mode of the intra prediction associated with the respective weight.

20 Claims, 11 Drawing Sheets

(56)                    References Cited

U.S. PATENT DOCUMENTS

| | | | |
|---|---|---|---|
| 2019/0045184 A1* | 2/2019 | Zhang | H04N 19/186 |
| 2019/0104303 A1* | 4/2019 | Xiu | H04N 19/182 |
| 2020/0007870 A1* | 1/2020 | Ramasubramonian | |
| | | | H04N 19/61 |
| 2020/0154107 A1* | 5/2020 | Zhao | H04N 19/176 |
| 2020/0162737 A1* | 5/2020 | Van der Auwera | H04N 19/82 |
| 2020/0351506 A1* | 11/2020 | Rath | H04N 19/167 |
| 2020/0413047 A1* | 12/2020 | Li | H04N 19/107 |
| 2021/0105464 A1* | 4/2021 | Choi | H04N 19/119 |
| 2021/0274167 A1* | 9/2021 | Liu | H04N 19/58 |
| 2022/0232241 A1* | 7/2022 | Wang | H04N 19/176 |
| 2022/0394269 A1* | 12/2022 | Cao | H04N 19/159 |
| 2022/0417511 A1* | 12/2022 | Li | H04N 19/159 |
| 2023/0291929 A1* | 9/2023 | Lee | H04N 19/176 |
| 2023/0300325 A1* | 9/2023 | Ahn | H04N 19/105 |
| | | | 375/240.12 |

* cited by examiner

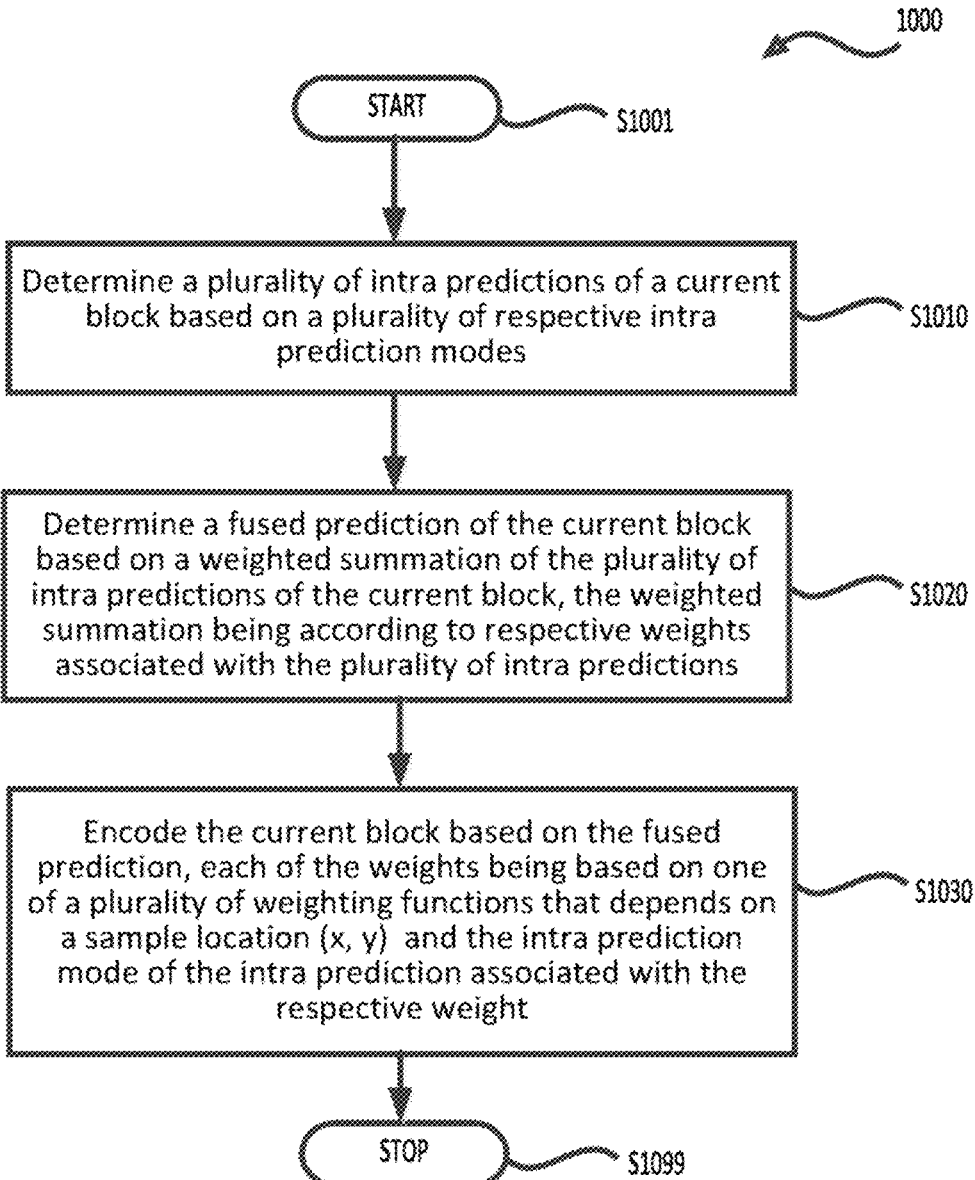

1000

START    S1001

Determine a plurality of intra predictions of a current block based on a plurality of respective intra prediction modes    S1010

Determine a fused prediction of the current block based on a weighted summation of the plurality of intra predictions of the current block, the weighted summation being according to respective weights associated with the plurality of intra predictions    S1020

Encode the current block based on the fused prediction, each of the weights being based on one of a plurality of weighting functions that depends on a sample location (x, y) and the intra prediction mode of the intra prediction associated with the respective weight    S1030

STOP    S1099

*FIG. 10*

FINE-GRAINED INTRA PREDICTION FUSION

RELATED APPLICATION

The present application claims the benefit of priority to U.S. Provisional Application No. 63/601,689 filed on Nov. 21, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding.

According to an aspect of the disclosure, a method for video decoding includes receiving coded information in a bitstream. The coded information indicates that a current block is predicted based on a combination of a plurality of intra prediction modes. The method for video decoding includes determining a plurality of intra predictions of the current block based on the respective intra prediction modes; determining a fused prediction of the current block based on a weighted summation of the plurality of intra predictions of the current block where the weighted summation is according to respective weights associated with the plurality of intra predictions, and reconstructing the current block based on the fused prediction. Each of the weights is based on one of a plurality of weighting functions that depends on a sample location (x, y) and the intra prediction mode of the intra prediction associated with the respective weight.

In an aspect, a method for video encoding includes determining a plurality of intra predictions of a current block based on a plurality of respective intra prediction modes; determining a fused prediction of the current block based on a weighted summation of the plurality of intra predictions of the current block where the weighted summation is according to respective weights associated with the plurality of intra predictions, and encoding the current block based on the fused prediction. Each of the weights is based on one of a plurality of weighting functions that depends on a sample location (x, y) and the intra prediction mode of the intra prediction associated with the respective weight.

In an aspect, a method of processing visual media data includes processing a bitstream of the visual media data according to a format rule. The bitstream includes a syntax element indicating that a current block is predicted based on a combination of a plurality of intra prediction modes. The format rule specifies that: a plurality of intra predictions of the current block is determined based on the respective intra prediction modes; a fused prediction of the current block is determined based on a weighted summation of the plurality of intra predictions of the current block where the weighted summation is according to respective weights associated with the plurality of intra predictions; the current block is reconstructed based on the fused prediction; and each of the weights is based on one of a plurality of weighting functions that depends on a sample location (x, y) and the intra prediction mode of the intra prediction associated with the respective weight.

Aspects of the disclosure also provide an apparatus for video encoding. The apparatus for video encoding including processing circuitry configured to implement any of the described methods for video encoding.

Aspects of the disclosure also provide an apparatus for video decoding. The apparatus for video decoding including processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

Technical solutions of the disclosure include aspects directed to determining a fused prediction of a current block based on a weighted summation of a plurality of intra predictions of the current block. The weighted summation may be according to respective weights associated with the plurality of intra predictions. In an aspect, a weighting function depends on a sample location (x, y) and the intra prediction mode of the intra prediction associated with a respective weight. In an example, the weighting function is further based on the subblock partition information of the current block where the weighting function in different subblocks of the current block may be determined separately. Thus, the weighting functions used in the disclosure addresses the heterogeneous region-related characteristics of different prediction signals used in the fusion intra predictions, and can generate the fused prediction that is a more accurate prediction than a fused prediction using other related weighting functions that do not account for subblock partition information and/or knowledge of the intra predictions.

BRIEF DESCRIPTION OF THE DRAWINGS

Further features, the nature, and various advantages of the disclosed subject matter will be more apparent from the following detailed description and the accompanying drawings in which:

FIG. 10 shows a flow chart outlining an encoding process according to some aspects of the disclosure.

DETAILED DESCRIPTION

Figure 1:
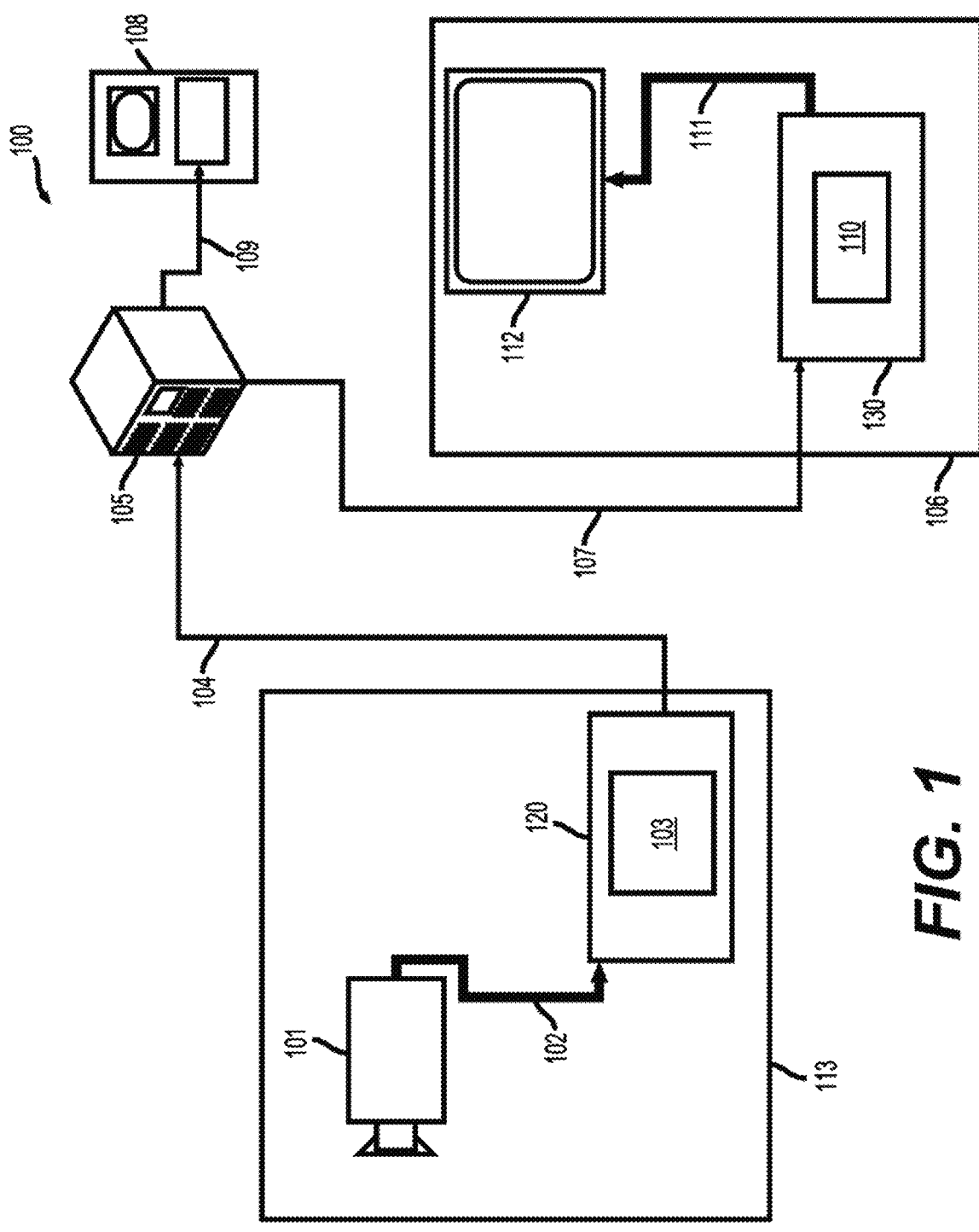
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
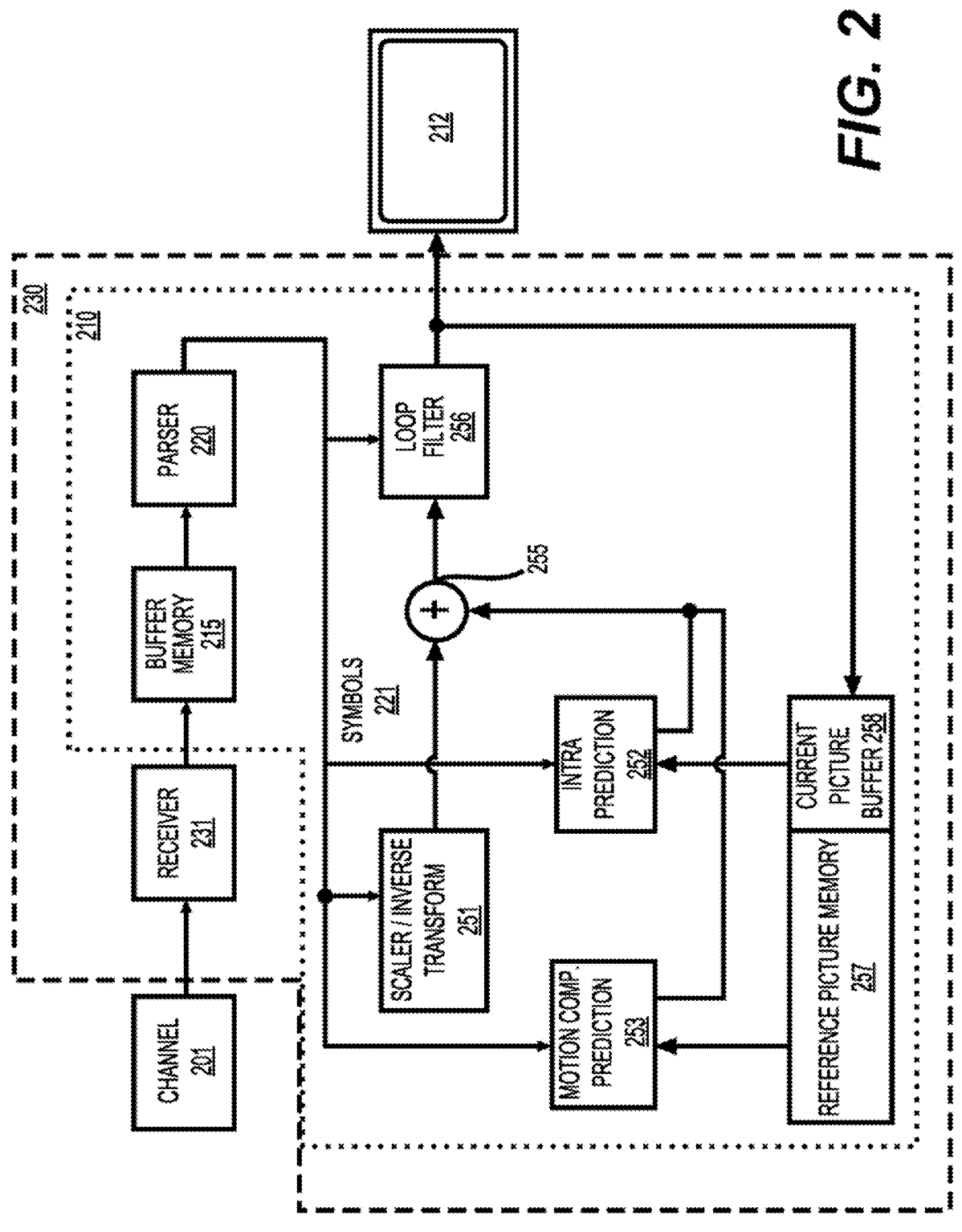
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
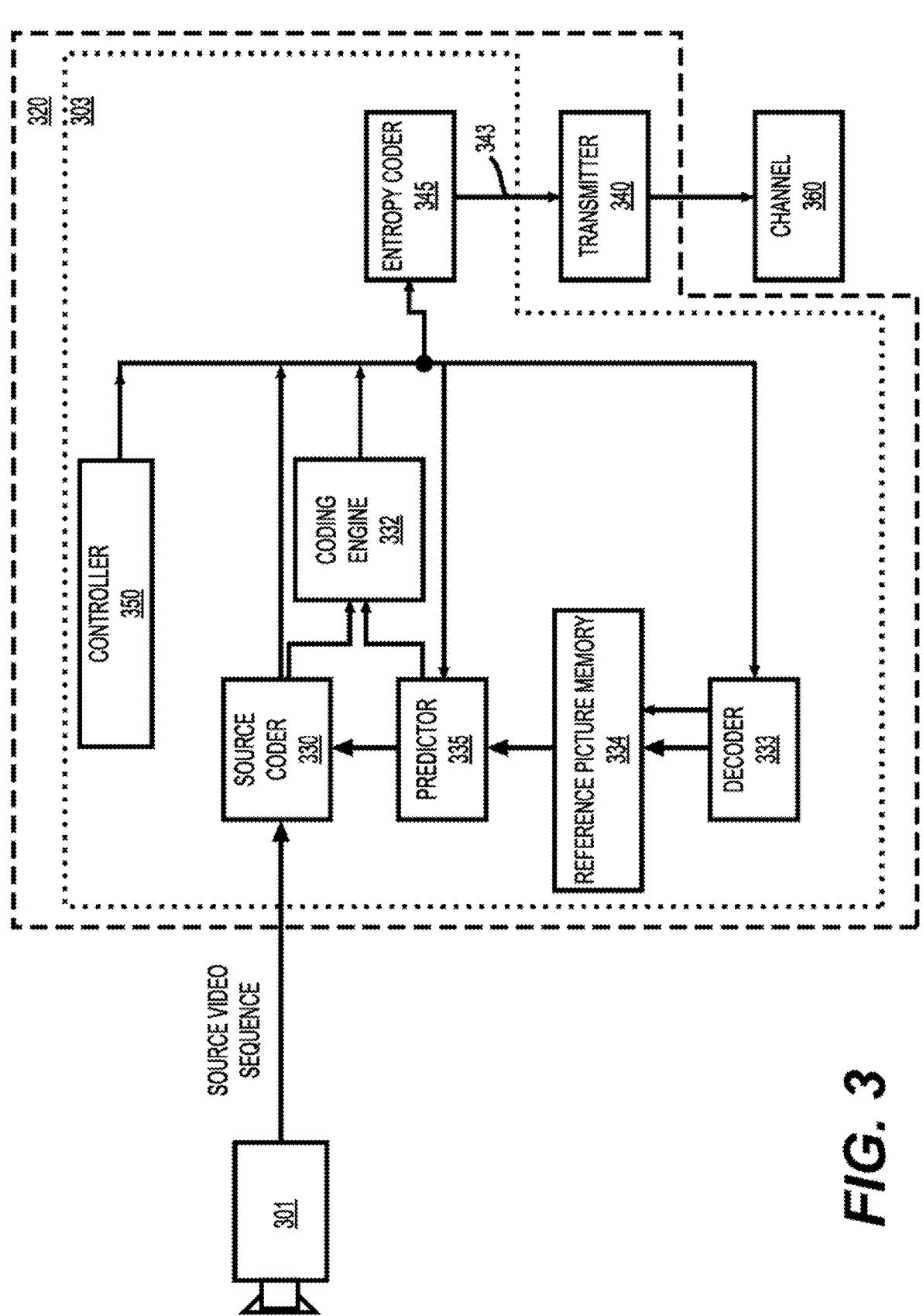
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

In intra prediction or an intra prediction mode, sample values of a coding block in a current picture may be predicted from samples that are already reconstructed (referred to as reference samples) in the current picture. The samples may be in one or more reference lines.

A predictor block may be formed using neighboring sample values of already available samples. Sample values of neighboring samples may be copied into the predictor block according to a direction. A reference to the direction in use may be coded in the bitstream or may itself be predicted.

An example of intra prediction is a planar mode that may use a bi-linear interpolation. In the planar mode, one or more positions in the current block may be predicted using reference samples in a reference line. Other positions in the current block may be predicted as a linear combination of sample(s) at the one or more positions and the reference samples. Weights may be determined according to a location of a current sample in the current block.

An example of intra prediction is a DC mode. To predict a sample in a block with the DC mode, an average of samples in a reference line may be used as the predictor.

An example of intra prediction is angular intra prediction. The angular intra prediction may also be referred to as an angular prediction method or an angular prediction mode. In the angular intra prediction, a current sample in a current block may be predicted using a reference sample (e.g., a prediction sample) or an interpolated reference sample, for example, in a reference line, such as shown in FIG. 4.

Figure 4:
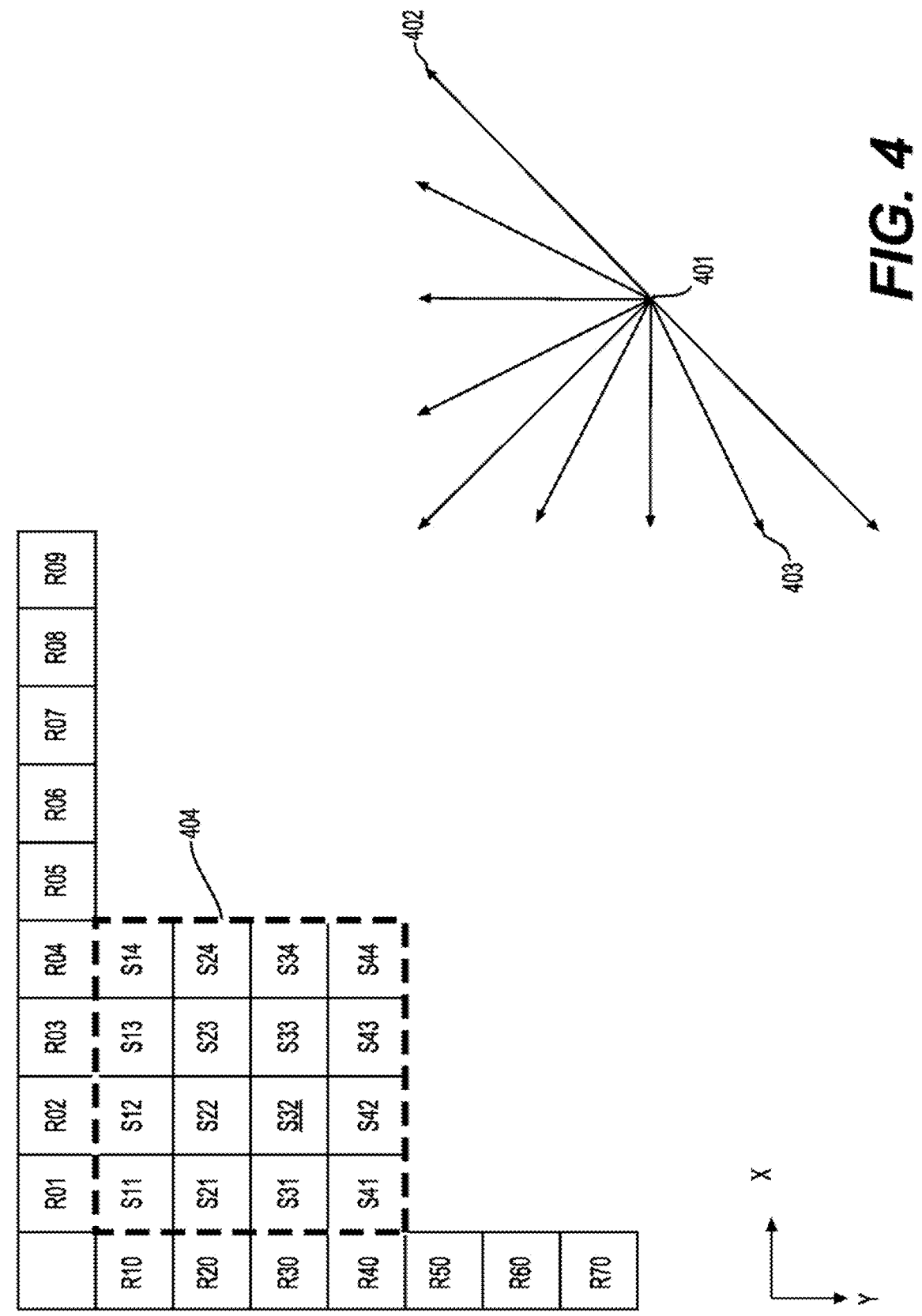
FIG. 4 shows an example of intra prediction according to an aspect of the disclosure.

Referring to FIG. 4, depicted in the lower right is a subset of nine predictor directions from a plurality of predictor directions (e.g., 33 angular modes of the 35 intra modes in H.265). A point (401) where the arrows converge represents a sample being predicted. Each of the arrows may represent a respective direction from which the sample is being predicted. For example, the arrow (402) indicates that the sample (401) is predicted from a sample or samples to the upper right, at a 45° angle from the horizontal direction. Similarly, the arrow (403) indicates that the sample (401) is predicted from a sample or samples to the lower left of the sample (401), in a 22.5° angle from the horizontal direction.

Still referring to FIG. 4, on the top left there is depicted a square block (404) of 4×4 samples (indicated by a dashed, boldface line). The square block (404) includes 16 samples, each labelled with an "S", its position in the Y dimension (e.g., row index) and its position in the X dimension (e.g., column index). For example, a sample S21 is the second sample in the Y dimension (from the top) and the first (from the left) sample in the X dimension. Similarly, a sample S44 is the fourth sample in block (404) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to the block (404). In some examples, prediction samples neighbor the block under reconstruction; therefore, no negative values need to be used.

Intra picture prediction may work by copying reference sample values from the neighboring samples indicated by the signaled prediction direction. For example, assume the coded video bitstream includes signaling that, for this block, indicates a prediction direction consistent with the arrow (402)—that is, samples are predicted from samples to the upper right, at a 45° angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45°.

The number of possible directions has increased as video coding technology has developed. In an example, such as in H.264, nine different directions may be represented. In an example, such as in H.265, 33 different directions may be used. In an example, such as in JEM/VVC/BMS, up to 65 directions may be used. Experiments have been conducted to identify the most likely directions, and certain techniques in the entropy coding are used to represent those likely directions in a small number of bits, accepting a certain penalty for less likely directions. In some examples, the directions may be predicted from neighboring directions used in neighboring, already decoded, blocks.

Various intra prediction coding tools are introduced to improve the encoding efficiency, including but not limited to: angular intra prediction with 65 angles and 4-tap interpolation filters, wide-angle intra prediction (WAIP), position dependent prediction combination (PDPC), multiple reference line (MRL) prediction, an intra sub-partition (ISP) Mode, matrix-based intra prediction (MIP), a cross component linear model (CCLM), intra mode coding with 6 most probable modes (MPM)s, and/or the like.

Figure 5:
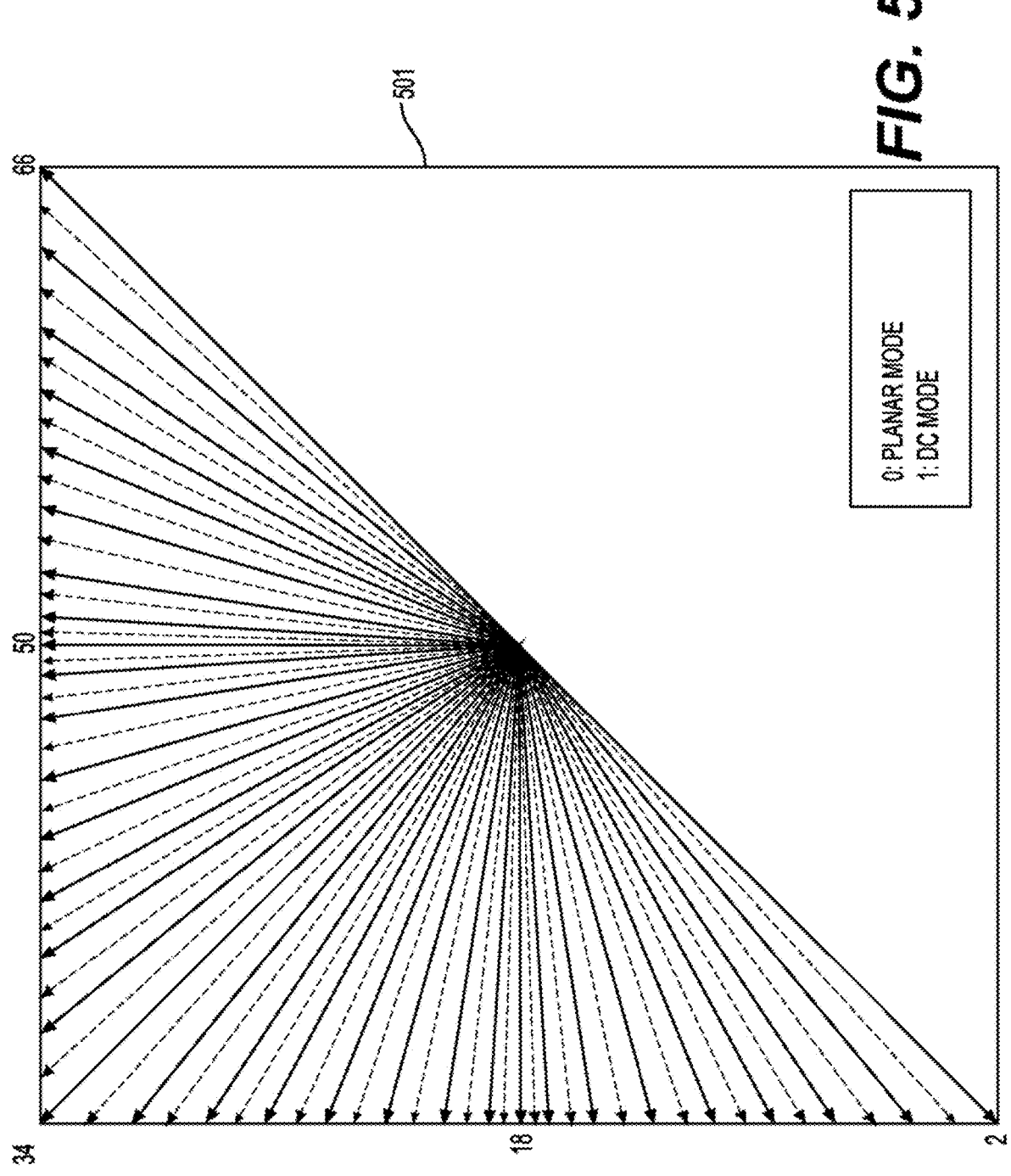
FIG. 5 shows an example of 67 intra prediction modes according to an aspect of the disclosure.

FIG. 5 shows a schematic (501) that depicts 67 intra prediction modes for example, according to JEM. The 67 intra prediction modes may include 65 angular modes (or angular prediction modes) corresponding to 65 intra prediction directions, respectively, the planar mode, and the DC mode. The mapping of intra prediction direction bits that represent the direction in the coded video bitstream may be different from video coding technology to video coding technology. Such mapping may range, for example, from simple direct mappings, to codewords, to complex adaptive schemes involving most probable modes, and similar techniques. In most cases, however, there may be certain directions that are statistically less likely to occur in video content than certain other directions. As the goal of video compression is the reduction of redundancy, those less likely directions may, in a well working video coding technology, be represented by a larger number of bits than more likely directions.

In some examples, intra prediction modes used to predict a current block may include angular prediction modes, such as the 65 angular modes shown in FIG. 5 and non-angular modes. Examples of non-angular mode include the planar mode (e.g., the mode 0), the DC mode (e.g., the mode 1) shown in FIG. 5, and the like.

In some examples, a template may be used to derive an intra prediction mode for a current block (also referred to as a current coding block). A current coding block and neighboring samples of the current coding block may share similar texture characteristics. Thus, neighboring reconstructed samples of the current coding block may be employed to predict the current coding block. A template may include the neighboring samples (e.g., the neighboring reconstructed samples) of the current coding block.

A method A may include a template-based derivation method that can derive a prediction mode such as an intra prediction mode for the current block. In an example, the method A includes template-based intra prediction mode derivation (TIMD) that may be applied to the current coding block. When the template and the current coding block are well correlated, the intra prediction mode applied to the template may give a good indication for the current block.

Figure 6:
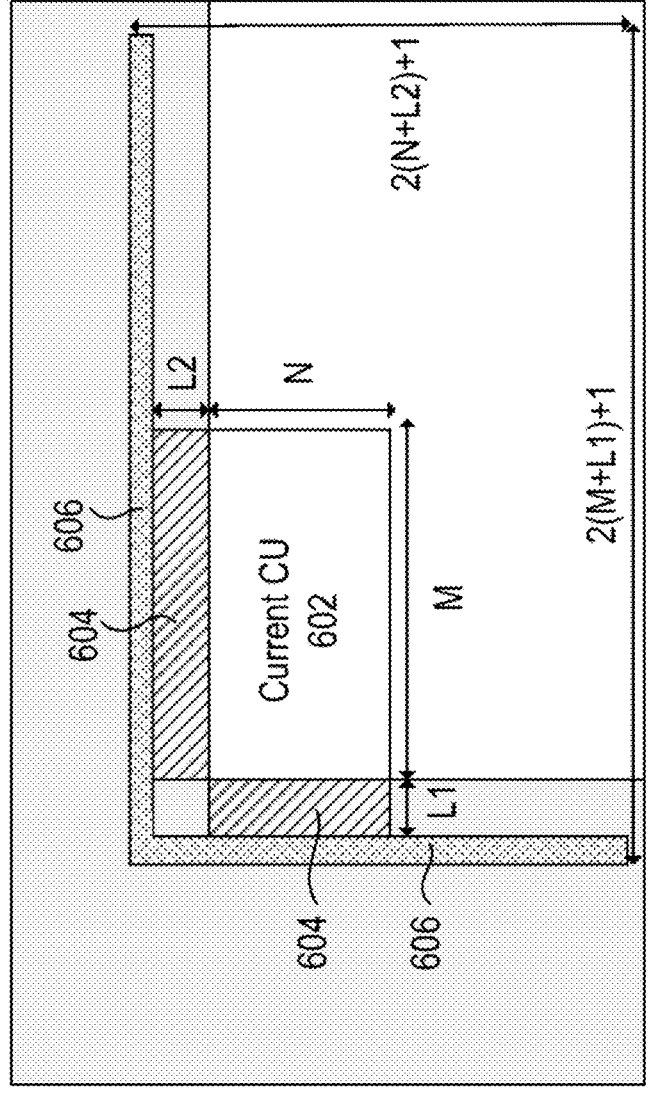
FIG. 6 shows an example of template-based intra mode derivation method according to an aspect of the disclosure.

Referring to FIG. 6, neighboring reconstructed samples of a current CU (or a current block) (602) may be used as a template (604). The template (604) may have any suitable shape and include any suitable number of samples. The template (604) may be adjacent to the current CU (602). In an aspect, the template (604) includes reconstructed samples. In the example shown in FIG. 6, the template (604) has an "L" shape and includes a top template that is above the current CU (602) and a left template that is to the left of the current CU (602). In an example, the template (604) includes a top-left corner that is adjacent to the current CU (602). In an example, the template (604) includes the top template that is above the current CU (602). In an example, the template (604) includes the left template that is to the left of the current CU (602).

Reference samples (606) may be adjacent to the template (604). In an example, the reference samples (606) may include at least one line (e.g., at least one row and/or at least one column) of samples.

In some examples, according to the method A, the intra mode derivation using the template may include one or more of the following steps:

In a step 1, a group of samples may be defined as reference of the template (604), as shown in FIG. 6. The group of samples may be used as the reference samples (606) to generate a prediction signal of the template (604).

In a step 2, an intra prediction mode may be exercised (e.g., may be applied) to the reference samples (606) of the template (604) to generate the prediction signal, e.g., the prediction of the template (604). In an example, a pre-defined intra prediction mode set may include pre-defined intra modes (also referred to as pre-defined intra prediction modes), and the intra prediction mode that is applied to the reference samples (606) of the template (604) is one of the pre-defined intra modes.

In a step 3, a cost between the prediction signal of the template (604) and the template (604) may be determined. In an example, the template (604) is the reconstruction signal of the template (604) which is represented by the reconstructed samples in the template (604).

In an example, the cost is a sum of absolute transformed differences (SATD) cost between the prediction signal of the template (604) and the reconstruction signal of the template (604) and is calculated. In an example, the cost is a mean removal sum of absolute differences (MRSAD) between the prediction signal of the template (604) and the reconstruction signal of the template (604).

In a step 4, the steps 2 and 3 may be repeated for another mode in the pre-defined intra prediction mode set. The pre-defined intra modes may be sorted (e.g., ranked) based on the respective costs (e.g., the SATD costs or the MRSAD costs).

In a step 5, the mode with the least cost (e.g., the least SATD cost) is chosen as the prediction mode for the current block or the current CU (602). For the convenience of description, the prediction mode that is determined may be referred to as a template-based intra mode.

In some examples, in the method A, a plurality of prediction modes (e.g., a plurality of intra prediction modes) for the current CU (602) corresponding to least cost(s) in the costs may be selected, and the plurality of prediction modes may be referred to as template-based intra modes.

In an example, the method A may include the TIMD. In an aspect, the TIMD may use reference samples of a current CU as a template and select an intra mode among a set of candidate intra prediction modes that is associated with the TIMD. The selected intra mode may be determined as a best intra mode based on a cost function, for example. As shown in FIG. 6, the neighboring reconstructed samples of the current CU (602) can be used as the template (604). The reconstructed samples in the template (604) can be compared with the prediction samples of the template (604). The prediction samples can be generated using the reference samples (606) of the template (604). The reference samples (606) can include the neighboring reconstructed samples around the template (604). A cost function can be used to calculate a cost (or distortion) between the prediction samples and the reconstructed samples in the template (604) based on a respective one of the set of candidate intra prediction modes, such as described in the steps 3-4 above. An intra prediction mode with a minimum cost (or distortion) can be selected as the intra prediction mode (e.g., best intra prediction mode) to intra predict the current CU (602), such as described in the step 5. As described above, in some examples, in the TIMD, a plurality of intra prediction modes for the current CU (602) corresponding to least cost(s) in the costs may be selected, and the plurality of prediction modes may be referred to as template-based intra modes.

Referring to FIG. 6, a size of the reference samples (606) may depend on a size of the current CU (602) such as a block width M and a block height N and a size of the template (604) such as a template width L1 of the left template and a template height L2 of the top template. In an example, a width of the reference samples (606) may be equal to 2(M+L1)+1 and a height of the reference samples (606) may be equal to 2(N+L2)+1 if the reference samples (606) only consists one line of samples (e.g., one column of samples to the left of the template (604) and one row of samples above the template (604)).

Figure 7:
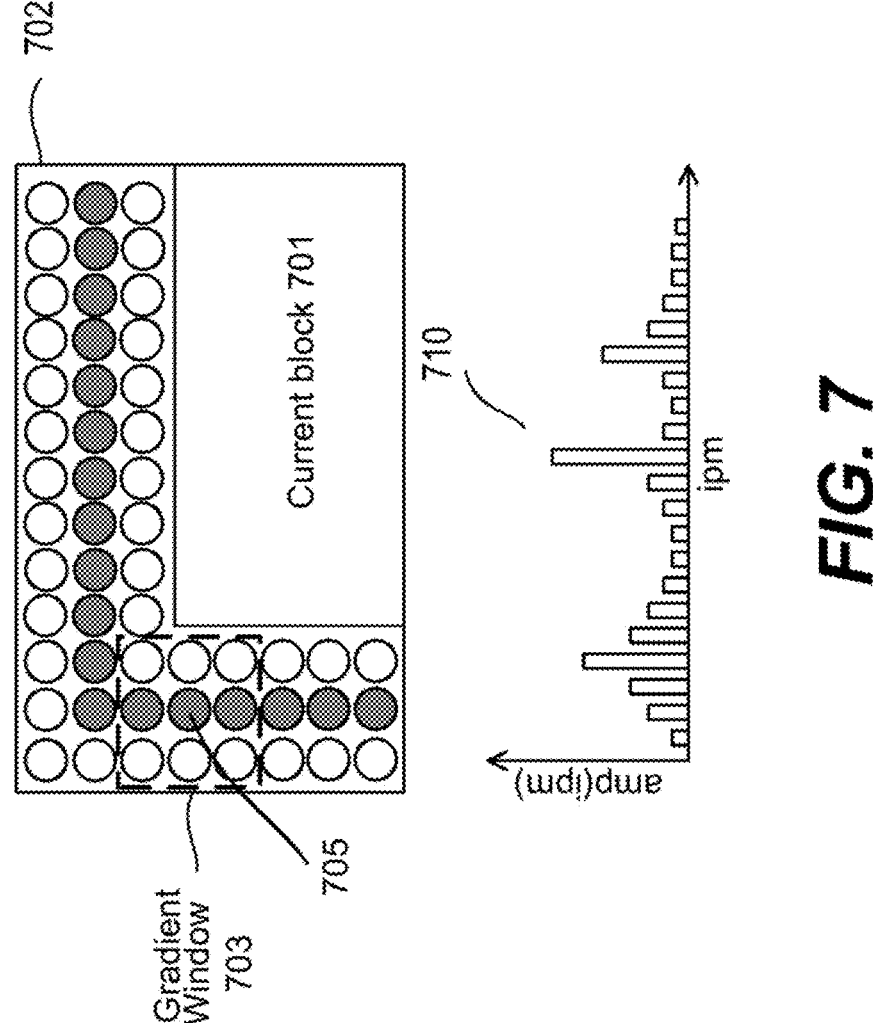
FIG. 7 shows an example of a decoder-side intra mode derivation (DIMD) according to an aspect of the disclosure.

In an example, the method A may include a decoder-side intra mode derivation (DIMD). When the DIMD is applied, N intra modes can be derived from reconstructed neighbor samples around a current block (701), and the N predictors obtained using the N intra modes can be combined with the planar mode predictor with corresponding weights. The weights can be derived from gradients, such as a histogram of gradient (HoG) computation. FIG. 7 shows an example of the DIMD. The HoG computation can be carried out by applying filters (e.g., horizontal and vertical Sobel filters) on pixels in a template (702) around the current block (701). The template (702) can include reconstructed neighbor samples around the current block (701). In an example, the template has a width of 3. In an example, pixels (marked in gray) in the middle line of the template (702) can be involved in the HoG computation. Referring to FIG. 7, a window (703) around a pixel (705) can be used to determine a gradient associated with the pixel (705). The window (703) can have a size of 3×3 with the pixel (705) in the center of the window (703). A horizontal gradient and a vertical gradient can be obtained using, for example, horizontal and vertical Sobel filters, respectively. A direction or an orientation can be obtained from the horizontal gradient and the vertical gradient. An intra prediction mode associated with the direction can be determined. Subsequently, a histogram of intra prediction modes (also referred to as a HoG) (710) can be obtained. The intra prediction modes corresponding to N tallest histogram bars can be selected for the current block (701). In an example, the N intra prediction modes may be referred to as template-based intra modes.

Aspects of the disclosure describe fine-grained intra prediction fusion methods.

Video coding has been widely used in many applications. Various video coding standards such as H264, H265, H266 (or VVC), AV1, and AVS have been widely adopted. In an aspect, a video codec may include multiple modules, including intra/inter prediction, transform coding, quantization, entropy coding, in loop filtering, and the like. Intra prediction may be one of the main modules, and may include signaling processing methods (e.g., signaling processing methods) and neural network-based methods. The disclosure includes methods for the intra prediction module of video codecs. For example, fine-grained intra prediction fusion methods are disclosed to improve the quality of intra prediction.

As described above, in intra prediction, samples of a given block such as a current block may be predicted using spatially neighboring blocks of the current block. The spatially neighboring blocks of the current block and the current block may be in a same picture. In an example, for the given block, reconstructed samples from a top neighbor and a left neighbor of the given block are used to predict the samples in the given block. For the given block, the samples obtained from the spatial neighbors are known as reference samples, which are used to produce the intra prediction (also referred to as a intra prediction signal) for the given block.

Given reference samples, various intra prediction methods may be applied to generate the intra prediction signal. Intra prediction methods may also be referred to as intra prediction modes. Intra prediction methods may be categorized as angular prediction methods (also referred to as angular prediction modes) and non-angular prediction methods (also referred to as non-angular prediction modes).

An intra prediction method (or an intra prediction mode) may generate an intra prediction (also referred to as an intra prediction signal) by emphasizing specific patterns in the reference samples. Intra prediction fusion may refer to a method where intra predictions (or intra prediction signals) from multiple intra prediction modes (or multiple intra prediction methods) are combined to generate a fused prediction which may be referred to as a final intra prediction signal. The intra prediction fusion described in the disclosure may be referred to as a fusion of intra prediction or intra prediction signal fusion. In various examples, since the fused prediction signal includes multiple emphasized patterns, a quality of the fused prediction signal may be better than a quality of a respective prediction signal from each individual intra prediction mode.

In an aspect, the fusion of intra prediction may be described as follows. For example, k intra predictions (or intra prediction signals) $s_1, \ldots, s_k$ are to be fused. The fused signal (denoted by s) is given by $$\hat{s}(x, y) = \frac{\sum_{i=1}^{k} w_i(x, y) s_i(x, y)}{\sum_{t=1}^{k} w_t(x, y)} \qquad \text{Eq. (1)}$$

x, y are sample indices. (x, y) may indicate a sample location in a current block that is being predicted. $w_i(x, y)$ is a value such as an integer value specifying a weighting function such as a sample weighting function that is associated with an i-th intra prediction $s_i$. In the example, $1 \leq x \leq W$ and $1 \leq y \leq H$, where W and H represent a width and a height of the prediction signal, respectively. W and H may represent a width and a height of the current block that is being predicted. The weighting function is referred to as a sample weighting function when the weighting function varies with a sample location.

In related intra prediction fusion methods, the sample weighting function $w_i(x, y)$ is a function that has the same analytical form over the entire intra prediction signal. In some examples, this design fails to address the heterogeneous region-related characteristics of different prediction signals used in the fusion process.

According to an aspect of the disclosure, fine-grained sample weighting functions may be applied in the intra prediction fusion. In some examples, a current block to be intra predicted (also referred to as an intra predicted block) is partitioned into l subblocks $R_1, \ldots, R_l$, and l is a positive integer larger than 1. Within a j-th subblock $R_j$ (e.g., when a sample is within the j-th subblock as indicated by $(x, y) \in R_j$), a weighting function $$w_i^{R_j}(x, y)$$

may be separately determined for the i-th intra prediction mode based on information related to the intra prediction mode, the current block, and subblock partition information, which may include the characteristics of the intra prediction mode, a block shape, a block size, subblock shape information, subblock size information, subblock location information, and/or the like. In an aspect, the weighting function of the entire block or the entire current block is given by $$w_i(x, y) = w_i^{R_j}(x, y), (x, y) \in R_j \qquad \text{Eq. (2)}$$

Figures 8A, 8B, 8C, 8D:
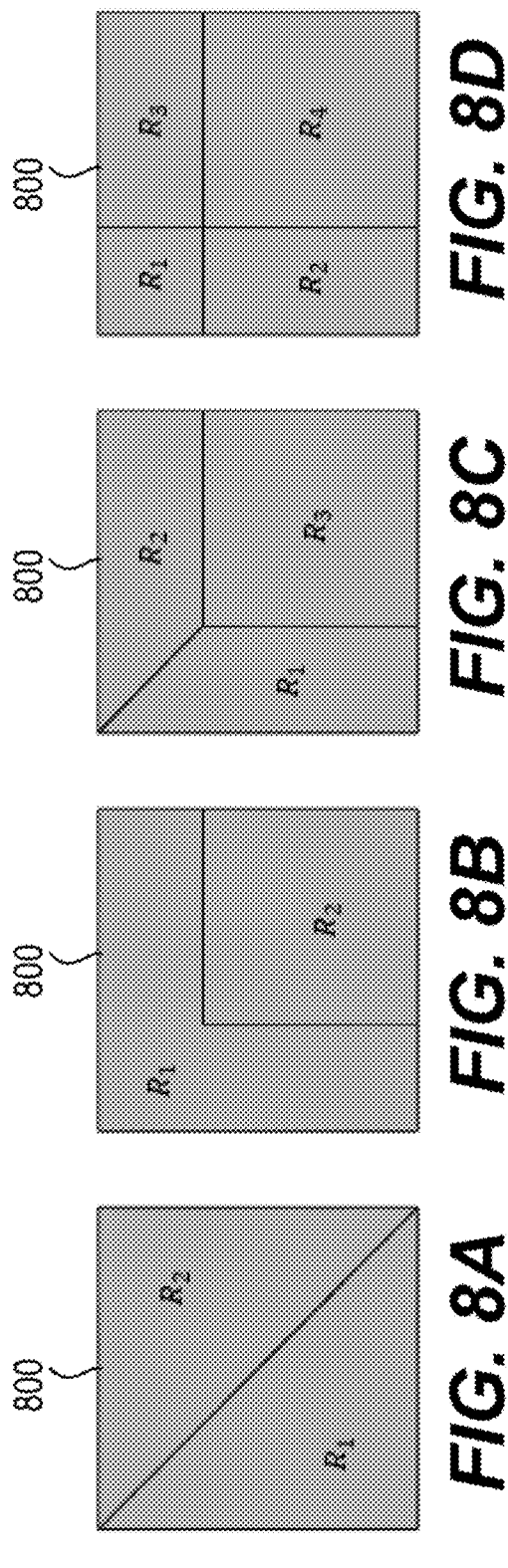
FIGS. 8A-8D show examples of subblock partitions of a current block according to an aspect of the disclosure.

FIGS. 8A-8D show examples of subblock partitions of a current block (or an intra predicted block) (800) according to an aspect of the disclosure. In FIG. 8A, the current block (800) is partitioned into two subblocks such as a bottom-left subblock (e.g., a bottom-left triangular subblock) $R_1$ and a top-right subblock (e.g., a top-right triangular subblock) $R_2$, and l is 2.

In FIG. 8B, the current block (800) is partitioned into two subblocks such as a top-left subblock (e.g., an L-shaped top-left subblock) $R_1$ and a bottom-right subblock (e.g., a rectangular bottom-right subblock) $R_2$, and l is 2.

In FIG. 8C, the current block (800) is partitioned into three subblocks such as a left subblock $R_1$, a top subblock $R_2$, and a bottom-right subblock $R_3$. $R_1$ is to the left of $R_3$, $R_2$ is above $R_3$, and l is 3.

In FIG. 8D, the current block (800) is partitioned into four subblocks such as a top-left subblock $R_1$, a bottom-left subblock $R_2$, a top-right subblock $R_3$, and a bottom-right subblock $R_4$, and l is 4. In an example, $R_1$-$R_4$ in FIG. 8D are rectangular, however, shapes of $R_1$-$R_4$ may be different from the rectangular shape.

The proposed fine-grained intra prediction fusion method can improve the quality of the fused intra prediction signal.

According to an aspect of the disclosure, a current block may be predicted based on a combination of a plurality of intra prediction modes using the fusion of intra prediction method. A plurality of intra predictions of the current block may be determined based on the respective intra prediction modes. A fused prediction of the current block may be determined based on a weighted summation of the plurality of intra predictions of the current block. The weighted summation may be according to respective weights associated with the plurality of intra predictions. The current block may be coded (e.g., reconstructed or encoded) based on the fused prediction. Each of the weights may be based on one of a plurality of weighting functions that depends on a sample location (x, y) and the intra prediction mode of the intra prediction associated with the respective weight.

In an aspect, the current block is partitioned into subblocks. Subblock partition information of the current block indicates the subblock locations, the subblock shapes of the respective subblocks, and the like. The respective one (e.g., indicated by $$w_i^{R_j}(x, y))$$

of the plurality of weighting functions is further based on the subblock partition information of the current block, for example, in addition to the intra prediction mode. The weighting function $$w_i^{R_j}(x, y)$$

may be associated with the ith intra prediction $s_i$ indicated by an index i and a jth subblock $R_j$ indicated by an index j in the subblocks. The ith intra prediction $s_i$ may be determined based on the i-th intra prediction mode. The index i is from 1 to k that is a number of the plurality of intra predictions, and the index j is from 1 to l that is the number of the subblocks.

In an aspect, the sample weighting function (e.g., indicated by $$w_i^{R_j}(x, y))$$

is determined separately in each subblock (e.g., indicated by $R_j$) of the intra predicted signal (e.g., indicated by $s_i$ and associated with an i-th intra prediction mode). For example, the sample weighting function associated with the same intra prediction mode (e.g., the i-th intra prediction mode) is determined separately in each subblock. Thus, the sample weighting function in the subblock $R_1$ and associated with the i-th intra prediction mode $$w_i^{R_1}(x, y)$$

and the sample weighting function in the subblock $R_2$ associated with the i-th intra prediction mode $$w_i^{R_2}(x, y)$$

are determined separately. Accordingly, the heterogeneous region-related characteristics of an intra prediction used in the fusion of intra predictions are addressed.

In each subblock, the sample weighting function may be determined based on information related to the intra prediction mode that is associated with the intra prediction $s_i$, the intra predicted block (or the current block), and the subblock partition information such as shown in FIGS. 8A-8D. The subblock partition information may indicate how to partition a block into subblocks or a partition scheme. The subblock partition information may include subblock shapes, subblock locations, and/or subblock sizes of the respective subblocks in the current block.

In an aspect, the sample weighting function (e.g., indicated by $$w_i^{R_j}(x, y))$$

in each subblock (e.g., indicated by $R_j$) is based on the intra prediction mode (e.g., indicated by an i-th intra prediction mode) and the subblock location of the respective subblock. In an example, the sample weighting function may vary with the sample location (x, y).

In an example, the plurality of intra prediction modes includes a horizontal angular prediction mode (e.g., the mode 18 as shown in FIG. 5) and a vertical angular prediction mode (e.g., the mode 50 as shown in FIG. 5). The plurality of intra predictions includes $s_1$ associated with the horizontal angular prediction mode and $s_2$ associated with the vertical angular prediction mode, and k is 2. The subblock partition information of the current block indicates that the current block is partitioned into a bottom-left triangular subblock $R_1$ and a top-right triangular subblock $R_2$, and l is 2 such as shown in FIG. 8A. The plurality of weighting functions includes $$w_1^{R_1}(x, y)$$

associated with $s_1$ in $$R_1, w_2^{R_1}(x, y)$$

associated with $s_2$ in $$R_1, w_1^{R_2}(x, y)$$

associated with $s_1$ in $R_2$, and $$w_2^{R_2}(x, y)$$

associated with $s_2$ in $R_2$. As described here, the fusion method is used in the fusion of the prediction signals $s_1$ and $s_2$, where $s_1$ is from the horizontal angular prediction mode (or the horizontal angular prediction method) and $s_2$ is from the vertical angular prediction mode (or the vertical angular prediction method). A subblock partition selected for this scenario is shown in FIG. 8A. A total of 4 separate weighting functions $$w_i^{R_j}(x, y)$$

are chosen such that more weights are assigned to $s_1$ in the subblock $R_1$, and more weights are assigned to $s_2$ in the subblock $R_2$. Thus, $$w_1^{R_1}(x, y) > w_2^{R_1}(x, y), \text{ and } w_1^{R_2}(x, y) < w_2^{R_2}(x, y).$$

In an example, the plurality of intra prediction modes includes an angular prediction mode and a non-angular prediction mode. The plurality of intra predictions includes $s_1$ associated with the angular prediction mode and $s_2$ associated with the non-angular prediction mode. The subblock partition information of the current block indicates that the current block is partitioned into an L-shaped top-left subblock $R_1$ and a rectangular bottom-right subblock $R_2$ such as shown in FIG. 8B. The plurality of weighting functions includes $$w_1^{R_1}(x, y)$$

associated with $s_1$ in $$R_1, w_2^{R_1}(x, y)$$

associated with $s_2$ in $$R_1, w_1^{R_2}(x, y)$$

associated with $s_1$ in $R_2$, and $$w_2^{R_2}(x, y)$$

associated with $s_2$ in $R_2$. As described here, the fusion method is used in the fusion of prediction signals $s_1$, $s_2$, where $s_1$ is from the angular prediction method and $s_2$ is from the non-angular prediction method. A subblock partition selected for this scenario is shown in FIG. 8B. A total of 4 separate weighting functions $$w_i^{R_j}(x, y)$$

are chosen such that more weights are assigned to $s_1$ in the subblock $R_1$, and thus $$w_1^{R_1}(x, y) > w_2^{R_1}(x, y),$$

and more weights are assigned to $s_2$ in the subblock $R_2$, and thus $$w_1^{R_2}(x, y) < w_2^{R_2}(x, y).$$

In an example, the plurality of intra prediction modes includes a horizontal angular prediction mode, a vertical angular prediction mode, and a non-angular prediction mode. The plurality of intra predictions includes $s_1$ associated with the horizontal angular prediction mode, $s_2$ associated with the vertical angular prediction mode, and $s_3$ associated with the non-angular prediction mode. The subblock partition information of the current block indicates that the current block is partitioned into a left subblock $R_1$, a top subblock $R_2$, and a bottom-right subblock $R_3$, $R_1$ and $R_2$ being to the left of $R_3$ and above $R_3$, respectively, such as shown in FIG. 8C. The plurality of weighting functions includes $$w_1^{R_1}(x, y)$$

associated with $s_1$ in $$R_1, w_2^{R_1}(x, y)$$

associated with $s_2$ in $$R_1, w_3^{R_1}(x, y)$$

associated with $s_3$ in $$R_1, w_1^{R_2}(x, y)$$

associated with $s_1$ in $R_2$, $$w_2^{R_2}(x, y)$$

associated with $s_2$ in $$R_2, w_3^{R_2}(x, y)$$

associated with $s_3$ in $$R_2, w_1^{R_3}(x, y)$$

associated with $s_1$ in $$R_3, w_2^{R_3}(x, y)$$

associated with $s_2$ in $R_3$, and $$w_3^{R_3}(x, y)$$

associated with $s_3$ in $R_3$. For example, the fusion method is used in the fusion of prediction signals $s_1$, $s_2$, $s_3$, where $s_1$ is from the horizontal angular prediction method, $s_2$ is from the vertical angular prediction method, and $s_3$ is from the non-angular prediction method. A subblock partition selected for this scenario is shown in FIG. 8C. A total of 9 separate weighting functions $$w_i^{R_j}(x, y)$$

are chosen such that more weights are assigned to $s_1$ in the subblock $R_1$, and thus $$w_1^{R_1}(x, y)$$

is larger than $$w_2^{R_1}(x,\ y) \text{ and } w_3^{R_1}(x,\ y);$$

more weights are assigned to $s_2$ in the subblock $R_2$, and thus $$w_2^{R_2}(x,\ y)$$

is larger than $$w_1^{R_2}(x,\ y) \text{ and } w_3^{R_2}(x,\ y);$$

and more weights are assigned to $s_3$ in the subblock $R_3$, and thus $$w_3^{R_3}(x,\ y)$$

is larger than $$w_1^{R_3}(x,\ y) \text{ and } w_2^{R_3}(x,\ y).$$

In an example, the plurality of intra prediction modes includes a horizontal angular prediction mode, a vertical angular prediction mode, and a non-angular prediction mode. The plurality of intra predictions includes $s_1$ associated with the horizontal angular prediction mode, $s_2$ associated with the vertical angular prediction mode, and $s_3$ associated with the non-angular prediction mode. The subblock partition information of the current block indicates that the current block is partitioned into a top-left subblock $R_1$, a bottom-left subblock $R_2$, a top-right subblock $R_3$, and a bottom-right subblock $R_4$. The plurality of weighting functions includes $$w_1^{R_1}(x,\ y)$$

associated with $s_1$ in $$R_1, w_2^{R_1}(x,\ y)$$

associated with $s_2$ in $$R_1, w_3^{R_1}(x,\ y)$$

associated with $s_3$ in $$R_1, w_1^{R_2}(x,\ y)$$

associated with $s_1$ in $$R_2, w_2^{R_2}(x,\ y)$$

associated with $s_2$ in $$R_2, w_3^{R_2}(x,\ y)$$

associated with $s_3$ in $$R_2, w_1^{R_3}(x,\ y)$$

associated with $s_1$ in $$R_3, w_2^{R_3}(x,\ y)$$

associated with $s_2$ in $$R_3, w_3^{R_3}(x,\ y)$$

associated with $s_3$ in $$R_3, w_1^{R_4}(x,\ y)$$

associated with $s_1$ in $$R_4, w_2^{R_4}(x,\ y)$$

associated with $s_2$ in $R_4$, and $$w_3^{R_4}(x,\ y)$$

associated with $s_3$ in $R_4$. As described here, the fusion method is used in the fusion of prediction signals $s_1$, $s_2$, $s_3$, where $s_1$ is from the horizontal angular prediction method, $s_2$ is from the vertical angular prediction method, and $s_3$ is from the non-angular prediction method. A subblock partition selected for this scenario is shown in FIG. 8D. A total of 12 separate weighting functions $$w_i^{R_j}(x,\ y)$$

are chosen such that equal weights are assigned to $s_1$ and $s_2$ in the subblock $R_1$, and thus $$w_1^{R_1}(x,\ y) = w_2^{R_1}(x,\ y);$$

more weights are assigned to $s_1$ in the subblock $R_2$, and thus $$w_1^{R2}(x,\,y)$$

is larger than $$W_2^{R2}(x,\,y) \text{ and } w_3^{R2}(x,\,y);$$

more weights are assigned to $s_2$ in the subblock $R_3$, and thus $$w_2^{R3}(x,\,y)$$

is larger than $$W_1^{R3}(x,\,y) \text{ and } w_3^{R3}(x,\,y);$$

and more weights are assigned to $s_3$ in the subblock $R_4$, and thus $$w_3^{R4}(x,\,y)$$

is larger than $$w_1^{R4}(x,\,y) \text{ and } w_2^{R4}(x,\,y).$$

In an aspect, the sample weighting function in each subblock may be based on the intra prediction mode, the subblock location, and the sample location (also referred to as a pixel location) indicated by (x, y).

In an example, the plurality of intra prediction modes includes an angular prediction mode and a non-angular prediction mode. The plurality of intra predictions includes $s_1$ associated with the angular prediction mode and $s_2$ associated with the non-angular prediction mode. The subblock partition information of the current block indicates that the current block is partitioned into an L-shaped top-left subblock $R_1$ and a rectangular bottom-right subblock $R_2$. The plurality of weighting functions includes $$w_1^{R1}(x,\,y)$$

associated with $s_1$ in $$R_1,\, w_2^{R1}(x,\,y)$$

associated with $s_2$ in $$R_1,\, w_1^{R2}(x,\,y)$$

associated with $s_1$ in $R_2$, and associated with $s_2$ in $R_2$. As described here, the fusion method is used in the fusion of prediction signals $s_1$, $s_2$, where $s_1$ is from the angular prediction method and $s_2$ is from the non-angular prediction method. A subblock partition selected for this scenario is shown in FIG. 8B. The weighting functions in each subblock are defined as follows:

$$W_1^{R1}(x,\,y) = C_1 \qquad \text{Eq. (3)}$$

$$W_2^{R1}(x,\,y) = C_2 \qquad \text{Eq. (4)}$$

$$W_1^{R2}(x,\,y) \propto C_3\left(1 - \frac{x}{W}\right) \text{ or } W_1^{R2}(x,\,y) \propto C_3\left(1 - \frac{y}{H}\right) \qquad \text{Eq. (5)}$$

$$W_2^{R2}(x,\,y) \propto C_3\left(\frac{x}{W}\right) \text{ or } W_2^{R2}(x,\,y) \propto C_3\left(\frac{y}{H}\right) \qquad \text{Eq. (6)}$$

Here, $C_1$, $C_2$, $C_3$ are constants such as location independent weight values which may be derived based on a cost function such as SAD or SATD. For a region such as the subblock $R_1$, the weighting of two predictors is not dependent on the sample location such as shown in Eqs. (3)-(4). For a region such as the subblock $R_2$, the weighting of the angular predictor $s_1$ is reduced towards the right direction and/or the bottom direction as indicated by Eq. (5), and the weighting of the non-angular predictor $s_2$ is increased towards the right direction and/or the bottom direction as indicated by Eq. (6). The symbol $\propto$ indicates such a decreasing or increasing trend based on the sample location that contributes to the final weighting of predictors $s_1$, $s_2$. For example, $$W_1^{R2}(x,\,y)$$

is proportional to $$C_3\left(1 - \frac{x}{W}\right) \text{ or } C_3\left(1 - \frac{y}{H}\right).$$

$W_2^{R2}(x,\,y)$ is proportional to $$C_3\left(\frac{x}{W}\right)$$

when $$W_1^{R2}(x,\,y)$$

is proportional to $$C_3\left(1 - \frac{x}{W}\right)$$

and $W_2^{R2}(x,\,y)$ is proportional to $$C_3\left(\frac{y}{H}\right)$$

when $$W_1^{R2}(x, y)$$

is proportional to $$C_3\left(1 - \frac{y}{H}\right).$$

In an example, the plurality of intra prediction modes includes a first angular prediction mode, a second angular prediction mode, and a non-angular prediction mode. The plurality of intra predictions includes $s_1$ associated with the first angular prediction mode, $s_2$ associated with the second angular prediction mode, and $s_3$ associated with the non-angular prediction mode. The subblock partition information of the current block indicates that the current block is partitioned into an L-shaped top-left subblock $R_1$ and a rectangular bottom-right subblock $R_2$. The plurality of weighting functions includes $$w_1^{R1}(x, y)$$

associated with $s_1$ in $R_1$, $$w_2^{R1}(x, y)$$

associated with $s_2$ in $$R_1, w_3^{R1}(x, y)$$

associated with $s_3$ in $$R_1, w_1^{R2}(x, y)$$

associated with $s_1$ in $$R_2, w_2^{R2}(x, y)$$

associated with $s_2$ in $$R_2, w_3^{R2}(x, y)$$

associated with $s_3$ in $R_2$. As described here, the fusion method is used in the fusion of prediction signals $s_1$, $s_2$, $s_3$, where $s_1$, $s_2$ are from the angular prediction methods (e.g., the first angular prediction mode and the second angular prediction mode) and $s_3$ is from the non-angular prediction method. A subblock partition selected for this scenario is shown in FIG. 8B. The weighting functions in each subblock are defined as follows:

$$W_1^{R1}(x, y) = C_1 \qquad \text{Eq. (7)}$$

$$W_2^{R1}(x, y) = C_2 \qquad \text{Eq. (8)}$$

$$W_I^{R2}(x, y) \propto C_3\left(1 - \frac{x}{W}\right) \text{ or } W_I^{R2}(x, y) \propto C_3\left(1 - \frac{y}{H}\right) \qquad \text{Eq. (9)}$$

$$W_2^{R2}(x, y) \propto C_4\left(1 - \frac{x}{W}\right) \text{ or } W_2^{R2}(x, y) \propto C_4\left(1 - \frac{y}{H}\right) \qquad \text{Eq. (10)}$$

$$W_3^{R2}(x, y) \propto C_5\left(\frac{x}{W}\right) \text{ or } W_3^{R2}(x, y) \propto C_5\left(\frac{y}{H}\right) \qquad \text{Eq. (11)}$$

Here, $C_1$, $C_2$, $C_3$, $C_4$, $C_5$ are constants such as location independent weight values which may be derived based on a cost function such as SAD or SATD. For a region such as the subblock $R_1$, the weighting of the three predictors $s_1$, $s_2$, $s_3$ are not dependent on the sample location, and $$w_1^{R1}(x, y), w_2^{R1}(x, y), \text{ and } w_3^{R1}(x, y)$$

are constants. For example, $$w_3^{R1}(x, y) = C_6$$

which is a constant. For a region such as the subblock $R_2$, the weighting functions of the angular predictor $s_1$ and $s_2$ may be reduced towards the right and/or the bottom direction, for example, $$W_1^{R2}(x, y) \text{ and } W_2^{R2}(x, y)$$

decrease with one of x and y, as shown in Eqs. (9) and (10). The weighting of the non-angular predictor $s_3$ is increased towards the right and/or the bottom direction, for example, $$W_3^{R2}(x, y)$$

increases with the one of x and y such as shown in Eq. (11). The symbol $\propto$ indicates such a decreasing or increasing trend based on the sample location that contributes to the final weighting of predictor $s_1$, $s_2$ and $s_3$.

In an example, the sum of weights of all predictors (e.g., all intra predictions at a sample location) is equal to $2^N$, where N is a non-negative value, such as a non-negative integer. For example, for the subblock $$R_j, w_1^{R_j}(x, y) + w_2^{R_j}(x, y) + \ldots + w_k^{R_j}(x, y) = 2^N \text{(e.g., 32 or 64)}.$$

In an example, for each subblock, $$w_1^{R_j}(x, y) + w_2^{R_j}(x, y) + \ldots + w_k^{R_j}(x, y) = 2^N.$$

In an aspect, the sample weighting function may be based on the intra prediction mode and the sample location. In some examples, the choice of the weighting functions considers certain prior knowledge of the intra predictions. For example, if the intra prediction is generated by an angle prediction mode, a weighting function that gives more weight to a top-left corner may be used. If the intra prediction is generated by a non-angular prediction mode such as the planar mode, a weighting function that gives more weight to a bottom-right corner may be used. This feature is different from the weighting function used in some related technologies where the same type of weighting function is used regardless of the intra prediction modes used to generate the intra predictions.

In an example, the plurality of intra prediction modes includes at least one angular prediction mode and at least one non-angular prediction mode. At least one weighting function of the plurality of weighting functions that is associated with the at least one angular prediction mode decreases towards one of a right direction and a bottom direction. At least one weighting function of the plurality of weighting functions that is associated with the at least one non-angular prediction mode increases towards the one of the right direction and the bottom direction.

For example, the at least one angular prediction mode is an angular prediction mode, and the at least one non-angular prediction mode is a non-angular prediction mode. As described here, the fusion method is used in the fusion of prediction signals $s_1$, $s_2$, where $s_1$ is from the angular prediction method and $s_2$ is from the non-angular prediction method. The at least one weighting function associated with the angular prediction mode is $w_1(x, y)$ proportional to $$C_1 \left(1 - \frac{x}{W}\right) \text{ or } C_1 \left(1 - \frac{y}{H}\right),$$

such as shown in Eq. (12), and W and H are a width and a height of the current block, respectively. When $w_1(x, y)$ is proportional to $$C_1 \left(1 - \frac{x}{W}\right),$$

the at least one weighting function associated with the non-angular prediction mode is $w_2(x, y)$ proportional to $$C_1 \left(\frac{x}{W}\right),$$

and when is proportional to $$C_1 \left(1 - \frac{y}{H}\right),$$

the at least one weighting function associated with the non-angular prediction mode is $w_2(x, y)$ proportional to $$C_1 \left(\frac{y}{H}\right).$$

The weighting functions for the entire prediction block (the entire current block) are defined as follows:

$$w_1(x, y) \propto C_1 \left(1 - \frac{x}{W}\right) \text{ or } w_1(x, y) \propto C_1 \left(1 - \frac{y}{H}\right) \qquad \text{Eq. (12)}$$

$$w_2(x, y) \propto C_1 \left(\frac{x}{W}\right) \text{ or } w_2(x, y) \propto C_1 \left(\frac{y}{H}\right) \qquad \text{Eq. (13)}$$

Here, $C_1$ is a constant such as a location independent weight value that may be derived based on a cost function such as SAD or SATD. The weighting $w_1(x, y)$ of the angular predictor $s_1$ is reduced towards the right/bottom direction such as shown in Eq. (12), and the weighting $w_2(x, y)$ of the non-angular predictor $s_2$ is increased towards the right/bottom direction such as shown in Eq. (13). Symbol $\propto$ indicates such a decreasing/increasing trend based on the sample location that contributes to the final weighting of predictor $s_1$ and $s_2$.

In an example, the at least one angular prediction mode includes a first angular prediction mode and a second angular prediction mode, and the at least one non-angular prediction mode is a non-angular prediction mode. The fusion method is used in the fusion of prediction signals $s_1$, $s_2$, $s_3$, where $s_1$, $s_2$ are from the angular prediction methods (e.g., the first angular prediction mode and the second angular prediction mode) and $s_3$ is from the non-angular prediction method. The weighting functions $w_1(x, y)$, $w_2(x, y)$, and $w_3(x, y)$ for the whole prediction block are defined as follows:

$$w_1(x, y) \propto C_3 \left(1 - \frac{x}{W}\right) \text{ or } w_1(x, y) \propto C_3 \left(1 - \frac{y}{H}\right) \qquad \text{Eq. (14)}$$

$$w_2(x, y) \propto C_4 \left(1 - \frac{x}{W}\right) \text{ or } w_2(x, y) \propto C_4 \left(1 - \frac{y}{H}\right) \qquad \text{Eq. (15)}$$

$$w_3(x, y) \propto C_5 \left(\frac{x}{W}\right) \text{ or } w_3(x, y) \propto C_5 \left(\frac{y}{H}\right) \qquad \text{Eq. (16)}$$

A first weighting function $w_1(x, y)$ of the at least one weighting function associated with the first angular prediction mode is proportional to $$C_3 \left(1 - \frac{x}{W}\right) \text{ or } C_3 \left(1 - \frac{y}{H}\right)$$

as shown in Eq. (14). When $w_1(x, y)$ is proportional to $$C_3 \left(1 - \frac{x}{W}\right),$$

a second weighting function $w_2(x, y)$ of the at least one weighting function associated with the second angular prediction mode is proportional to $$C_4 \left(1 - \frac{x}{W}\right),$$

and a third weighting function $w_3(x, y)$ of the at least one weighting function associated with the non-angular prediction mode is proportional to $$C_5 \left(\frac{x}{W}\right).$$

When $w_1(x, y)$ is proportional to $$c_3 \left(1 - \frac{y}{H}\right),$$

$w_2(x, y)$ is proportional to $$c_4 \left(1 - \frac{y}{H}\right),$$

and $w_3(x, y)$ is proportional to $$c_5 \left(\frac{y}{H}\right).$$

Here, $C_3$, $C_4$, $C_5$ are constants such as location independent weight values which may be derived based on a cost function such as SAD or SATD. The weightings of the angular predictor $s_1$ and $s_2$ are reduced towards the right/bottom direction. The weighting of the non-angular predictor $s_3$ is increased towards the right/bottom direction.

Figure 9:
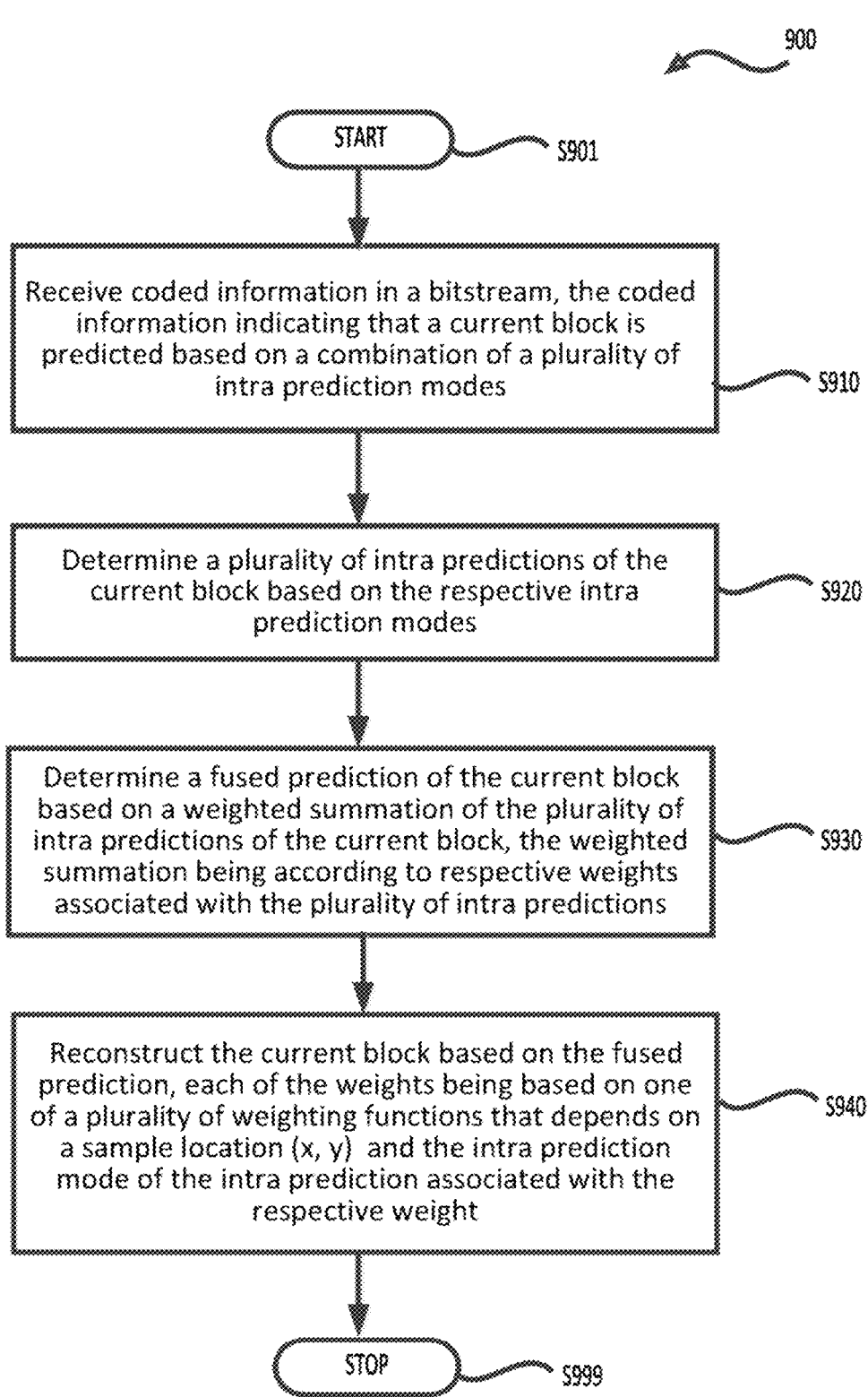
FIG. 9 shows a flow chart outlining a decoding process according to some aspects of the disclosure.

FIG. 9 shows a flow chart outlining a process (900) according to an aspect of the disclosure. The process (900) may be used in an apparatus, such as a video decoder. In various aspects, the process (900) is executed by processing circuitry, such as the processing circuitry that performs functions of the video decoder (110), the processing circuitry that performs functions of the video decoder (210), and the like. In some aspects, the process (900) is implemented in software instructions, thus when the processing circuitry executes the software instructions, the processing circuitry performs the process (900). The process starts at (S901) and proceeds to (S910).

At (S910), the process (900) includes receiving coded information in a bitstream. The coded information indicates that a current block is predicted based on a combination of a plurality of intra prediction modes.

At (S920), the process (900) includes determining a plurality of intra predictions of the current block based on the respective intra prediction modes.

At (S930), the process (900) includes determining a fused prediction of the current block based on a weighted summation of the plurality of intra predictions of the current block. The weighted summation is according to respective weights associated with the plurality of intra predictions. Each of the weights may be based on one of a plurality of weighting functions that depends on a sample location (x, y) and the intra prediction mode of the intra prediction associated with the respective weight.

At (S940), the process (900) includes reconstructing the current block based on the fused prediction.

Then, the process proceeds to (S999) and terminates.

The process (900) may be suitably adapted. Step(s) in the process (900) may be modified and/or omitted. Additional step(s) may be added. Any suitable order of implementation may be used.

FIG. 10 shows a flow chart outlining a process (1000) according to an aspect of the disclosure. The process (1000) may be used in a video encoder. In various aspects, the process (1000) is executed by processing circuitry, such as the processing circuitry that performs functions of the video encoder (103), the processing circuitry that performs functions of the video encoder (303), and the like. In some aspects, the process (1000) is implemented in software instructions, thus when the processing circuitry executes the software instructions, the processing circuitry performs the process (1000). The process starts at (S1001) and proceeds to (S1010).

At (S1010), the process (1000) includes determining a plurality of intra predictions of a current block based on a plurality of respective intra prediction modes.

At (S1020), the process (1000) includes determining a fused prediction of the current block based on a weighted summation of the plurality of intra predictions of the current block. The weighted summation is according to respective weights associated with the plurality of intra predictions. Each of the weights is based on one of a plurality of weighting functions that depends on a sample location (x, y) and the intra prediction mode of the intra prediction associated with the respective weight.

At (S1030), the process (1000) includes encoding the current block based on the fused prediction.

Then, the process proceeds to (S1099) and terminates.

The process (1000) may be suitably adapted. Step(s) in the process (1000) may be modified and/or omitted. Additional step(s) may be added. Any suitable order of implementation may be used.

Although the decoding and encoding processes are provided in separate flow charts for the purpose of description, it is noted that aspects of the decoding and encoding processes may be used in combination. For example, a decoding process such as described in the process (900) may incorporate all or a portion of the process (1000). In another example, an encoding process such as described in the process (1000) may be combined with the process (900).

In an aspect, a method of processing visual media data is disclosed. The method includes processing a bitstream of the visual media data according to a format rule. The bitstream includes a syntax element indicating that a current block is predicted based on a combination of a plurality of intra prediction modes. The format rule specifies that: a plurality of intra predictions of the current block is determined based on the respective intra prediction modes, a fused prediction of the current block is determined based on a weighted summation of the plurality of intra predictions of the current block, the weighted summation is according to respective weights associated with the plurality of intra predictions, and the current block is reconstructed based on the fused prediction. Each of the weights is based on one of a plurality of weighting functions that depends on a sample location (x, y) and the intra prediction mode of the intra prediction associated with the respective weight.

Aspects and/or examples in the disclosure may be used separately or combined in any order. For example, some aspects and/or examples performed by the decoder may be performed by the encoder and vice versa. Each of the methods, aspects, examples, an encoder, and a decoder may be implemented by processing circuitry (e.g., one or more processors or one or more integrated circuits). In one example, the one or more processors execute a program that is stored in a non-transitory computer-readable medium.

The techniques described above, may be implemented as computer software using computer-readable instructions and physically stored in one or more computer-readable media. For example, FIG. 11 shows a computer system (1100) suitable for implementing certain aspects of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by one or more computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 11:
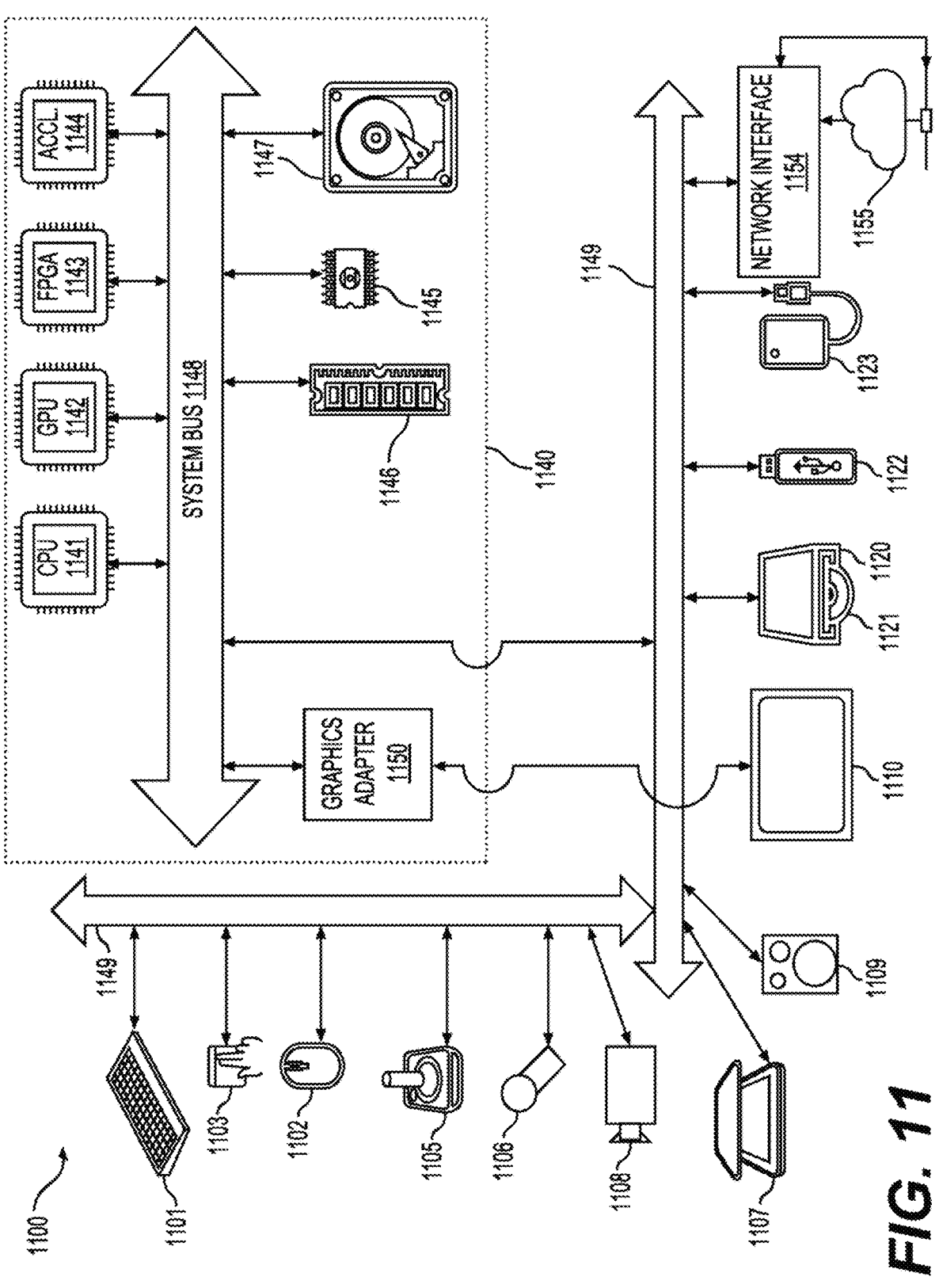
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical.

Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: receiving coded information in a bitstream, the coded information indicating that a current block is predicted based on a combination of a plurality of intra prediction modes; determining a plurality of intra predictions of the current block based on the respective intra prediction modes; determining a fused prediction of the current block based on a weighted summation of the plurality of intra predictions of the current block, the weighted summation being according to respective weights associated with the plurality of intra predictions, and reconstructing the current block based on the fused prediction. Each of the weights is based on one of a plurality of weighting functions that depends on a sample location $(x, y)$ and the intra prediction mode of the intra prediction associated with the respective weight.

(2) The method of feature (1), in which the current block is partitioned into subblocks; subblock partition information of the current block indicates subblock locations and subblock shapes of the respective subblocks; the respective one of the plurality of weighting functions is further based on the subblock partition information of the current block; and a weighting function $$w_i^{R_j}(x, y)$$

is associated with an ith intra prediction indicated by an index i and a jth subblock $R_j$ indicated by an index j in the subblocks, the index i being from 1 to k that is a number of the plurality of intra predictions, the index j being from 1 to 1 that is a number of the subblocks.

(3) The method of feature (2), in which the plurality of intra prediction modes includes a horizontal angular prediction mode and a vertical angular prediction mode; the plurality of intra predictions includes $s_1$ associated with the horizontal angular prediction mode and $s_2$ associated with the vertical angular prediction mode, and k is 2; the subblock partition information of the current block indicates that the current block is partitioned into a bottom-left triangular subblock $R_1$ and a top-right triangular subblock $R_2$, and 1 is 2; the plurality of weighting functions includes $$w_1^{R_1}(x, y)$$

associated with $s_1$ in $$R_1, w_2^{R_1}(x, y)$$

associated with $s_2$ in $$R_l, w_l^{R_2}(x, y)$$

associated with $s_1$ in $$R_2, \text{ and } w_2^{R_2}(x, y)$$

associated with $s_2$ in $$R_2; w_1^{R_1}(x, y) > w_2^{R_1}(x, y); \text{ and } w_1^{R_2}(x, y) < W_2^{R_2}(x, y).$$

(4) The method of feature (2), in which the plurality of intra prediction modes includes an angular prediction mode and a non-angular prediction mode; the plurality of intra predictions includes $s_1$ associated with the angular prediction mode and $s_2$ associated with the non-angular prediction mode; the subblock partition information of the current block indicates that the current block is partitioned into an L-shaped top-left subblock $R_1$ and a rectangular bottom-right subblock $R_2$; the plurality of weighting functions includes $$w_1^{R1}(x, y)$$

associated with $s_1$ in $$R_l, w_2^{R1}(x, y)$$

associated with $s_2$ in $$R_l, w_1^{R2}(x, y)$$

associated with $s_1$ in $$R_2, \text{ and } w_2^{R2}(x, y)$$

associated with $s_2$ in $$R_2;\ W_1^{R1}(x, y) > w_2^{R1}(x, y);\ \text{and } w_1^{R2}(x, y) < w_2^{R2}(x, y).$$

(5) The method of feature (2), in which the plurality of intra prediction modes includes a horizontal angular prediction mode, a vertical angular prediction mode, and a non-angular prediction mode; the plurality of intra predictions includes $s_1$ associated with the horizontal angular prediction mode, $s_2$ associated with the vertical angular prediction mode, and $s_3$ associated with the non-angular prediction mode; the subblock partition information of the current block indicates that the current block is partitioned into a left subblock $R_1$, a top subblock $R_2$, and a bottom-right subblock $R_3$, $R_1$ and $R_2$ being to the left of $R_3$ and above $R_3$, respectively; the plurality of weighting functions includes $$w_1^{R1}(x, y)$$

associated with $s_1$ in $$R_l, w_2^{R1}(x, y)$$

associated with $s_2$ in $$R_l, w_3^{R1}(x, y)$$

associated with $s_3$ in $$R_l, w_1^{R2}(x, y)$$

associated with $s_1$ in $$R_2, w_2^{R2}(x, y)$$

associated with $s_2$ in $$R_2, w_3^{R2}(x, y)$$

associated with $s_3$ in $$R_2, w_1^{R3}(x, y)$$

associated with $s_1$ in $$R_3, w_2^{R3}(x, y)$$

associated with $s_2$ in $$R_3, \text{ and } w_3^{R3}(x, y)$$

associated with $s_3$ in $$R_3;\ w_1^{R1}(x, y)$$

is larger than $$w_2^{R1}(x, y) \text{ and } w_3^{R1}(x, y);\ w_2^{R2}(x, y)$$

is larger than $$w_1^{R2}(x, y) \text{ and } w_3^{R2}(x, y);$$

and $$w_3^{R3}(x, y)$$

is larger than $$w_1^{R3}(x, y) \text{ and } w_2^{R3}(x, y).$$

(6) The method of feature (2), in which the plurality of intra prediction modes includes a horizontal angular prediction mode, a vertical angular prediction mode, and a non-angular prediction mode; the plurality of intra predictions includes $s_1$ associated with the horizontal angular prediction mode, $s_2$ associated with the vertical angular prediction mode, and $s_3$ associated with the non-angular prediction mode; the subblock partition information of the current block indicates that the current block is partitioned into a top-left subblock $R_1$, a bottom-left subblock $R_2$, a top-right subblock $R_3$, and a bottom-right subblock $R_4$; the plurality of weighting functions includes $$w_1^{R_1}(x, y)$$

associated with $s_1$ in $$R_1, w_2^{R_1}(x, y)$$

associated with $s_2$ in $$R_1, w_3^{R_1}(x, y)$$

associated with $s_3$ in $$R_1, w_1^{R_2}(x, y)$$

associated with $s_1$ in $$R_2, w_2^{R_2}(x, y)$$

associated with $s_2$ in $$R_2, w_3^{R_2}(x, y)$$

associated with $s_3$ in $$R_2, w_1^{R_3}(x, y)$$

associated with $s_1$ in $$R_3, w_2^{R_3}(x, y)$$

associated with $s_2$ in $$R_3, w_3^{R_3}(x, y)$$

associated with $s_3$ in $$R_3, w_1^{R_4}(x, y)$$

associated with $s_1$ in $$R_4, w_2^{R_4}(x, y)$$

associated with $s_2$ in $R_4$, and $$w_3^{R_4}(x, y)$$

associated with $s_3$ in $$R_4; w_1^{R_1}(x, y) = w_2^{R_1}(x, y); w_1^{R_2}(x, y)$$

is larger than $$w_2^{R_2}(x, y) \text{ and } w_3^{R_2}(x, y); w_2^{R_3}(x, y)$$

is larger than $$w_1^{R_3}(x, y) \text{ and } w_3^{R_3}(x, y); \text{ and } w_3^{R_4}(x, y)$$

is larger than $$w_1^{R_4}(x, y) \text{ and } w_2^{R_4}(x, y).$$

(7) The method of feature (2), in which the plurality of intra prediction modes includes an angular prediction mode and a non-angular prediction mode; the plurality of intra predictions includes $s_1$ associated with the angular prediction mode and $s_2$ associated with the non-angular prediction mode; the subblock partition information of the current block indicates that the current block is partitioned into an L-shaped top-left subblock $R_1$ and a rectangular bottom-right subblock $R_2$; the plurality of weighting functions includes $$w_1^{R_1}(x, y)$$

associated with $s_1$ in $$R_1, w_2^{R_1}(x, y)$$

associated with $s_2$ in $$R_1, w_1^{R_2}(x, y)$$

associated with $s_1$ in $$R_2, \text{ and } w_2^{R_2}(x, y)$$

associated with $s_2$ in $$R_2; W_1^{R_1}(x, y) = C_1; W_2^{R_1}(x, y) = C_2; W_1^{R_2}(x, y)$$

is proportional to $$C_3 \left(1 - \frac{x}{W}\right) \text{ or } C_3 \left(1 - \frac{y}{H}\right);$$

$$W_2^{R_2}(x, y)$$

is proportional to $$C_3 \left(\frac{x}{W}\right)$$

when $$W_1^{R_2}(x, y)$$

is proportional to $$C_3 \left(1 - \frac{x}{W}\right)$$

and $$W_2^{R_2}(x, y)$$

is proportional to $$C_3 \left(\frac{y}{H}\right)$$

when $$W_1^{R_2}(x, y)$$

is proportional to $$C_3 \left(1 - \frac{y}{H}\right);$$

and $C_1$, $C_2$ are $C_3$ are constants.

(8) The method of feature (2), in which the plurality of intra prediction modes includes a first angular prediction mode, a second angular prediction mode, and a non-angular prediction mode; the plurality of intra predictions includes $s_1$ associated with the first angular prediction mode, $s_2$ associated with the second angular prediction mode, and $s_3$ associated with the non-angular prediction mode; the subblock partition information of the current block indicates that the current block is partitioned into an L-shaped top-left subblock $R_1$ and a rectangular bottom-right subblock $R_2$; the plurality of weighting functions includes $$w_1^{R_1}(x, y)$$

associated with $s_1$ in $$R_1, w_2^{R_1}(x, y)$$

associated with $s_2$ in $$R_1, w_3^{R_1}(x, y)$$

associated with $s_3$ in $$R_1, w_1^{R_2}(x, y)$$

associated with $s_1$ in $$R_2, w_2^{R_2}(x, y)$$

associated with $s_2$ in $$R_2, w_3^{R_2}(x, y)$$

associated with $s_3$ in $$R_2; w_1^{R_1}(x, y), w_2^{R_1}(x, y), \text{ and } w_3^{R_1}(x, y)$$

are constants; and $$W_1^{R_2}(x, y) \text{ and } W_2^{R_2}(x, y)$$

decrease with one of x and y, and $$W_3^{R_2}(x, y)$$

increases with the one of x and y.

(9) The method of feature (1), in which the plurality of intra prediction modes includes at least one angular prediction mode and at least one non-angular prediction mode; at least one weighting function of the plurality of weighting functions that is associated with the at least one angular prediction mode decreases towards one of a right direction and a bottom direction; and at least one weighting function of the plurality of weighting functions that is associated with the at least one non-angular prediction mode increases towards the one of the right direction and the bottom direction.

(10) The method of feature (9), in which the at least one angular prediction mode is an angular prediction mode, and the at least one non-angular prediction mode is a non-angular prediction mode; the at least one weighting function associated with the angular prediction mode is $w_1(x, y)$ proportional to $$C_1 \left(1 - \frac{x}{W}\right) \text{ or } C_1 \left(1 - \frac{y}{H}\right),$$

W and H being a width and a height of the current block, respectively; when $w_1(x, y)$ is proportional to $$C_1 \left(1 - \frac{x}{W}\right),$$

the at least one weighting function associated with the non-angular prediction mode is $w_2(x, y)$ proportional to $$C_1 \left(\frac{x}{W}\right);$$

and when $w_1(x, y)$ is proportional to $$C_1 \left(1 - \frac{y}{H}\right),$$

the at least one weighting function associated with the non-angular prediction mode is $w_2(x, y)$ proportional to $$C_1 \left(\frac{y}{H}\right).$$

(11) The method of feature (9), in which the at least one angular prediction mode includes a first angular prediction mode and a second angular prediction mode, and the at least one non-angular prediction mode is a non-angular prediction mode; a first weighting function $w_1(x, y)$ of the at least one weighting function associated with the first angular prediction mode is proportional to $$C_3 \left(1 - \frac{x}{W}\right) \text{ or } C_3 \left(1 - \frac{y}{H}\right),$$

W and H being a width and a height of the current block, respectively; when $w_1(x, y)$ is proportional to $$C_3 \left(1 - \frac{x}{W}\right),$$

a second weighting function $w_2(x, y)$ of the at least one weighting function associated with the second angular prediction mode is proportional to $$C_4 \left(1 - \frac{x}{W}\right),$$

and a third weighting function $w_3(x, y)$ of the at least one weighting function associated with the non-angular prediction mode is proportional to $$C_5 \left(\frac{x}{W}\right);$$

and when $w_1(x, y)$ is proportional to $$C_3 \left(1 - \frac{y}{H}\right),$$

$w_2(x, y)$ is proportional to $$C_4 \left(1 - \frac{y}{H}\right),$$

and $w_3(x, y)$ is proportional to $$C_5 \left(\frac{y}{H}\right).$$

(12) A method for video encoding, the method including: determining a plurality of intra predictions of a current block based on a plurality of respective intra prediction modes; determining a fused prediction of the current block based on a weighted summation of the plurality of intra predictions of the current block, the weighted summation being according to respective weights associated with the plurality of intra predictions, and encoding the current block based on the fused prediction. Each of the weights is based on one of a plurality of weighting functions that depends on a sample location (x, y) and the intra prediction mode of the intra prediction associated with the respective weight.

(13) The method of feature (12), in which the current block is partitioned into subblocks; subblock partition information of the current block indicates subblock locations and subblock shapes of the respective subblocks; the respective one of the plurality of weighting functions is further based on the subblock partition information of the current block; and a weighting function $$w_i^{R_j}(x, y)$$

is associated with an ith intra prediction indicated by an index i and a jth subblock $R_j$ indicated by an index j in the subblocks, the index i being from 1 to k that is a number of the plurality of intra predictions, the index j being from 1 to 1 that is a number of the subblocks.

(14) The method of feature (13), in which the plurality of intra prediction modes includes a horizontal angular prediction mode and a vertical angular prediction mode; the plurality of intra predictions includes $s_1$ associated with the horizontal angular prediction mode and $s_2$ associated with the vertical angular prediction mode, and k is 2; the subblock partition information of the current block indicates that the current block is partitioned into a bottom-left triangular subblock $R_1$ and a top-right triangular subblock $R_2$, and 1 is 2; the plurality of weighting functions includes $$w_1^{R1}(x, y)$$

associated with $s_1$ in $$R_1, w_2^{R1}(x, y)$$

associated with $s_2$ in $$R_1, w_1^{R2}(x, y)$$

associated with $s_1$ in $R_2$, and $$w_2^{R2}(x, y)$$

associated with $s_2$ in $$R_2; w_1^{R1}(x, y) > w_2^{R1}(x, y); \text{ and } w_1^{R2}(x, y) < w_2^{R2}(x, y).$$

(15) The method of feature (13), in which the plurality of intra prediction modes includes an angular prediction mode and a non-angular prediction mode; the plurality of intra predictions include $s_1$ associated with the angular prediction mode and $s_2$ associated with the non-angular prediction mode; the subblock partition information of the current block indicates that the current block is partitioned into an L-shaped top-left subblock $R_1$ and a rectangular bottom-right subblock $R_2$; the plurality of weighting functions includes $$w_1^{R1}(x, y)$$

associated with $s_1$ in $$R_1, w_2^{R1}(x, y)$$

associated with $s_2$ in $$R_1, w_1^{R2}(x, y)$$

associated with $s_1$ in $R_2$, and $$w_2^{R2}(x, y)$$

associated with $s_2$ in $$R_2; w_1^{R1}(x, y) > w_2^{R1}(x, y); \text{ and } w_1^{R2}(x, y) < w_2^{R2}(x, y).$$

(16) The method of feature (13), in which the plurality of intra prediction modes includes a horizontal angular prediction mode, a vertical angular prediction mode, and a non-angular prediction mode; the plurality of intra predictions includes $s_1$ associated with the horizontal angular prediction mode, $s_2$ associated with the vertical angular prediction mode, and $s_3$ associated with the non-angular prediction mode; the subblock partition information of the current block indicates that the current block is partitioned into a left subblock $R_1$, a top subblock $R_2$, and a bottom-right subblock $R_3$, $R_1$ and $R_2$ being to the left of $R_3$ and above $R_3$, respectively; the plurality of weighting functions includes $$w_1^{R1}(x, y)$$

associated with $s_1$ in $$R_1, w_2^{R1}(x, y)$$

associated with $s_2$ in $$R_1, w_3^{R1}(x, y)$$

associated with $s_3$ in $$R_1, w_1^{R2}(x, y)$$

associated with $s_1$ in $$R_2, w_2^{R2}(x, y)$$

associated with $s_2$ in $$R_2, w_3^{R2}(x, y)$$

associated with $s_3$ in $$R_2, w_1^{R3}(x, y)$$

associated with $s_1$ in $$R_3, w_2^{R3}(x, y)$$

associated with $s_2$ in $R_3$, and $$w_3^{R_3}(x, y)$$

associated with $s_3$ in $$R_3; w_1^{R_1}(x, y)$$

is larger than $$w_2^{R_1}(x, y) \text{ and } w_3^{R_1}(x, y); w_2^{R_2}(x, y)$$

is larger than $$w_1^{R_2}(x, y) \text{ and } w_3^{R_2}(x, y);$$

and $$w_3^{R_3}(x, y)$$

is larger than $$w_1^{R_3}(x, y) \text{ and } w_2^{R_3}(x, y).$$

(17) The method of feature (13), in which the plurality of intra prediction modes includes a horizontal angular prediction mode, a vertical angular prediction mode, and a non-angular prediction mode; the plurality of intra predictions includes $s_1$ associated with the horizontal angular prediction mode, $s_2$ associated with the vertical angular prediction mode, and $s_3$ associated with the non-angular prediction mode; the subblock partition information of the current block indicates that the current block is partitioned into a top-left subblock $R_1$, a bottom-left subblock $R_2$, a top-right subblock $R_3$, and a bottom-right subblock $R_4$; the plurality of weighting functions includes $$w_1^{R_2}(x, y)$$

associated with $s_1$ in $$R_1, w_2^{R_1}(x, y)$$

associated with $s_2$ in $$R_1, w_3^{R_1}(x, y)$$

associated with $s_3$ in $$R_1, w_1^{R_2}(x, y)$$

associated with $s_1$ in $$R_2, w_2^{R_2}(x, y)$$

associated with $s_2$ in $$R_2, w_3^{R_2}(x, y)$$

associated with $s_3$ in $$R_2, w_1^{R_3}(x, y)$$

associated with $s_1$ in $$R_3, w_2^{R_3}(x, y)$$

associated with $s_2$ in $$R_3, w_3^{R_3}(x, y)$$

associated with $s_3$ in $$R_3, w_1^{R_4}(x, y)$$

associated with $s_1$ in $R_4$, $$w_2^{R_4}(x, y)$$

associated with $s_2$ in $R_4$, and $$w_3^{R_4}(x, y)$$

associated with $s_3$ in $$R_4; w_1^{R_1}(x, y) = w_2^{R_1}(x, y); w_1^{R_2}(x, y)$$

is larger than $$w_2^{R_2}(x, y) \text{ and } w_3^{R_2}(x, y); w_2^{R_3}(x, y)$$

is larger than $$w_1^{R3}(x, y) \text{ and } w_3^{R3}(x, y); \text{ and } w_3^{R4}(x, y)$$

is larger than $$w_1^{R4}(x, y) \text{ and } w_2^{R4}(x, y).$$

(18) The method of feature (13), in which the plurality of intra prediction modes includes an angular prediction mode and a non-angular prediction mode; the plurality of intra predictions includes $s_1$ associated with the angular prediction mode and $s_2$ associated with the non-angular prediction mode; the subblock partition information of the current block indicates that the current block is partitioned into an L-shaped top-left subblock $R_1$ and a rectangular bottom-right subblock $R_2$; the plurality of weighting functions includes $$w_1^{R1}(x, y)$$

associated with $s_1$ in $$R_1, w_2^{R1}(x, y)$$

associated with $s_2$ in $$R_1, w_1^{R2}(x, y)$$

associated with $s_1$ in $R_2$, and $$w_2^{R2}(x, y)$$

associated with $s_2$ in $$R_2; W_1^{R1}(x, y) = C_1; W_2^{R1}(x, y) = C_2; W_1^{R2}(x, y)$$

is proportional to $$C_3 \left(1 - \frac{x}{w}\right) \text{ or } C_3 \left(1 - \frac{y}{H}\right);$$

$$W_2^{R2}(x, y)$$

is proportional to $$C_3 \left(\frac{x}{w}\right)$$

when $$W_1^{R2}(x, y)$$

is proportional to $$C_3 \left(1 - \frac{x}{w}\right)$$

and $$W_2^{R2}(x, y)$$

is proportional to $$C_3 \left(\frac{y}{w}\right)$$

when $$W_1^{R2}(x, y)$$

is proportional to $$C_3 \left(1 - \frac{y}{H}\right);$$

and $C_1$, $C_2$ are $C_3$ are constants.

(19) The method of feature (12), in which the plurality of intra prediction modes includes at least one angular prediction mode and at least one non-angular prediction mode; at least one weighting function of the plurality of weighting functions that is associated with the at least one angular prediction mode decreases towards one of a right direction and a bottom direction; and at least one weighting function of the plurality of weighting functions that is associated with the at least one non-angular prediction mode increases towards the one of the right direction and the bottom direction.

(20) A method of processing visual media data, the method including: processing a bitstream of the visual media data according to a format rule, in which the bitstream includes a syntax element indicating that a current block is predicted based on a combination of a plurality of intra prediction modes; and the format rule specifies that: a plurality of intra predictions of the current block is determined based on the respective intra prediction modes; a fused prediction of the current block is determined based on a weighted summation of the plurality of intra predictions of the current block, the weighted summation being according to respective weights associated with the plurality of intra predictions; the current block is reconstructed based on the fused prediction; and each of the weights is based on one of a plurality of weighting functions that depends on a sample location (x, y) and the intra prediction mode of the intra prediction associated with the respective weight.

(21) An apparatus for video decoding, including processing circuitry that is configured to perform the method of any of features (1) to (11).

(22) An apparatus for video encoding, including processing circuitry that is configured to perform the method of any of features (12) to (19).

(23) A non-transitory computer-readable storage medium storing instructions which when executed by at least one processor cause the at least one processor to perform the method of any of features (1) to (19).

What is claimed is:

1. A method for video decoding, the method comprising:

receiving coded information in a bitstream, the coded information indicating that a current block is predicted based on a combination of a plurality of intra prediction modes;

determining a plurality of intra predictions of the current block based on respective intra prediction modes of the plurality of intra prediction modes;

determining a fused prediction of the current block based on a weighted summation of the plurality of intra predictions of the current block, the weighted summation being according to respective weights associated with the plurality of intra predictions, and reconstructing the current block based on the fused prediction, wherein each of the weights is based on a respective one of a plurality of weighting functions that depends on a sample location (x, y) and the intra prediction mode of the intra prediction associated with the respective weight, the plurality of intra predictions includes a first intra prediction $s_1$ and a second intra prediction $s_2$, and the plurality of weighting functions includes a first weighting function $w_1(x, y)$ associated with the first intra prediction and a second weighting function $w_2(x, y)$ associated with the second intra prediction, $w_1(x, y)$ being different from $w_2(x, y)$.

2. The method of claim 1, wherein the current block is partitioned into subblocks;

subblock partition information of the current block indicates subblock locations and subblock shapes of the respective subblocks;

the respective one of the plurality of weighting functions is further based on the subblock partition information of the current block;

a weighting function $$w_i^{R_j}(x, y)$$

is associated with an ith intra prediction indicated by an index i and a jth subblock $R_j$ indicated by an index j in the subblocks, the index i being from 1 to k that is a number of the plurality of intra predictions, the index j being from 1 to L that is a number of the subblocks; and $$w_1(x, y) = w_1^{R_j}(x, y), (x, y) \in R_j \text{ and } w_2^{R_j}(x, y), (x, y) \in R_j.$$

3. The method of claim 2, wherein the plurality of intra prediction modes includes a horizontal angular prediction mode and a vertical angular prediction mode;

$s_1$ is associated with the horizontal angular prediction mode and $s_2$ is associated with the vertical angular prediction mode, and k is 2;

50 the subblock partition information of the current block indicates that the current block is partitioned into a bottom-left triangular subblock $R_1$ and a top-right triangular subblock $R_2$, and L is 2;

$$w_1^{R_1}(x, y)$$

is associated with $s_1$ in $R_1$, $$w_2^{R_1}(x, y)$$

is associated with $s_2$ in $R_1$, $$w_1^{R_2}(x, y)$$

is associated with $s_1$ in $R_2$, and $$w_2^{R_2}(x, y)$$

is associated with $s_2$ in $R_2$;

$$w_1^{R_1}(x, y) > w_2^{R_1}(x, y); \text{ and}$$
$$w_1^{R_2}(x, y) < w_2^{R_2}(x, y).$$

4. The method of claim 2, wherein the plurality of intra prediction modes includes an angular prediction mode and a non-angular prediction mode;

$s_1$ is associated with the angular prediction mode and $s_2$ is associated with the non-angular prediction mode;

the subblock partition information of the current block indicates that the current block is partitioned into an L-shaped top-left subblock $R_1$ and a rectangular bottom-right subblock $R_2$;

$$w_1^{R_1}(x, y)$$

is associated with $s_1$ in $R_1$, $$w_2^{R_1}(x, y)$$

is associated with $s_2$ in $R_1$, $$w_1^{R_2}(x, y)$$

is associated with $s_1$ in $R_2$, and $$w_2^{R_2}(x, y)$$

is associated with $s_2$ in $R_2$;

$$w_1^{R1}(x, y) > w_2^{R1}(x, y); \text{ and}$$

$$w_1^{R2}(x, y) < w_2^{R2}(x, y).$$

5. The method of claim 2, wherein the plurality of intra prediction modes includes a horizontal angular prediction mode, a vertical angular prediction mode, and a non-angular prediction mode;

$s_1$ is associated with the horizontal angular prediction mode, $s_2$ is associated with the vertical angular prediction mode, and the plurality of intra predictions includes a third intra prediction $s_3$ associated with the non-angular prediction mode;

the subblock partition information of the current block indicates that the current block is partitioned into a left subblock $R_1$, a top subblock $R_2$, and a bottom-right subblock $R_3$, $R_1$ and $R_2$ being to the left of $R_3$ and above $R_3$, respectively;

the plurality of weighting functions includes a third weighting function $w_3(x, y)$ associated with $s_3$;

$$w_3(x, y) = w_3^{Rj}(x, y), (x, y) \in R_j;$$

$$w_1^{R1}(x, y)$$

is associated with $s_1$ in $R_1$, $$w_2^{R1}(x, y)$$

is associated with $s_2$ in $R_1$, $$w_3^{R1}(x, y)$$

is associated with $s_3$ in $R_1$, $$w_1^{R2}(x, y)$$

is associated with $s_1$ in $R_2$, $$w_2^{R2}(x, y)$$

is associated with $s_2$ in $R_2$, $$w_3^{R2}(x, y)$$

is associated with $s_3$ in $R_2$, $$w_1^{R3}(x, y)$$

is associated with $s_1$ in $R_3$, $$w_2^{R3}(x, y)$$

is associated with $s_2$ in $R_3$, and $$w_3^{R3}(x, y)$$

is associated with $s_3$ in $R_3$;

$$w_1^{R1}(x, y) \text{ is larger than } w_2^{R1}(x, y) \text{ and } w_3^{R1}(x, y);$$

$$w_2^{R2}(x, y) \text{ is larger than } w_1^{R2}(x, y) \text{ and } w_3^{R2}(x, y); \text{ and}$$

$$w_3^{R3}(x, y) \text{ is larger than } w_1^{R3}(x, y) \text{ and } w_2^{R3}(x, y).$$

6. The method of claim 2, wherein the plurality of intra prediction modes includes a horizontal angular prediction mode, a vertical angular prediction mode, and a non-angular prediction mode;

$s_1$ is associated with the horizontal angular prediction mode, $s_2$ is associated with the vertical angular prediction mode, and the plurality of intra predictions includes a third intra prediction $s_3$ associated with the non-angular prediction mode;

the subblock partition information of the current block indicates that the current block is partitioned into a top-left subblock $R_1$, a bottom-left subblock $R_2$, a top-right subblock $R_3$, and a bottom-right subblock $R_4$;

the plurality of weighting functions includes a third weighting function $w_3(x, y)$ associated with $s_3$;

$$w_3(x, y) = w_3^{Rj}(x, y), (x, y) \in R_j;$$

$$w_1^{R1}(x, y)$$

is associated with $s_1$ in $R_1$, $$w_2^{R1}(x, y)$$

is associated with $s_2$ in $R_1$, $$w_3^{R1}(x, y)$$

is associated with $s_3$ in $R_1$, $$w_1^{R2}(x, y)$$

is associated with $s_1$ in $R_2$, $$w_2^{R2}(x, y)$$

is associated with $s_2$ in $R_2$, $$w_3^{R2}(x, y)$$

is associated with $s_3$ in $R_2$, $$w_1^{R3}(x, y)$$

is associated with $s_1$ in $R_3$, $$w_2^{R3}(x, y)$$

is associated with $s_2$ in $R_3$, $$w_3^{R3}(x, y)$$

is associated with $s_3$ in $R_3$, $$w_1^{R4}(x, y)$$

is associated with $s_1$ in $R_4$, $$w_2^{R4}(x, y)$$

is associated with $s_2$ in $R_4$, and $$w_3^{R4}(x, y)$$

is associated with $s_3$ in $R_4$;

$$w_1^{R1}(x, y) = w_2^{R1}(x, y);$$

$w_1^{R2}(x, y)$ is larger than $w_2^{R2}(x, y)$ and $w_3^{R2}(x, y)$;

$w_2^{R3}(x, y)$ is larger than $w_1^{R3}(x, y)$ and $w_3^{R3}(x, y)$; and $w_3^{R4}(x, y)$ is larger than $w_1^{R4}(x, y)$ and $w_2^{R4}(x, y)$.

7. The method of claim 2, wherein the plurality of intra prediction modes includes an angular prediction mode and a non-angular prediction mode;

$s_1$ is associated with the angular prediction mode and $s_2$ is associated with the non-angular prediction mode;

the subblock partition information of the current block indicates that the current block is partitioned into an L-shaped top-left subblock $R_1$ and a rectangular bottom-right subblock $R_2$;

$$w_1^{R1}(x, y)$$

is associated with $s_1$ in $R_1$, $$w_2^{R1}(x, y)$$

is associated with $s_2$ in $R_1$, $$w_1^{R2}(x, y)$$

is associated with $s_1$ in $R_2$, and $$w_1^{R2}(x, y)$$

is associated with $s_2$ in $R_2$;

$$w_1^{R1}(x, y) = C_1;$$
$$w_2^{R1}(x, y) = C_2;$$
$$W_1^{R2}(x, y) \text{ is proportional to } C_3\left(1 - \frac{x}{w}\right) \text{ or } C_3\left(1 - \frac{y}{H}\right);$$

$$w_2^{R2}(x, y)$$

is proportional to $$C_3\left(\frac{x}{w}\right);$$

when $$w_1^{R2}(x, y)$$

is proportional to $$C_3\left(1 - \frac{x}{w}\right) \text{ and } w_2^{R2}(x, y)$$

is proportional to $$C_3\left(\frac{y}{H}\right) \text{ when } w_1^{R2}(x, y)$$

is proportional to $$C_3\left(1 - \frac{y}{H}\right);$$

and $C_1$, $C_2$ are $C_3$ are constants.

8. The method of claim 2, wherein the plurality of intra prediction modes includes a first angular prediction mode, a second angular prediction mode, and a non-angular prediction mode;

$s_1$ is associated with the first angular prediction mode, $s_2$ is associated with the second angular prediction mode, and the plurality of intra predictions includes a third intra prediction $s_3$ associated with the non-angular prediction mode;

the subblock partition information of the current block indicates that the current block is partitioned into an L-shaped top-left subblock $R_1$ and a rectangular bottom-right subblock $R_2$;

the plurality of weighting functions includes a third weighting function $w_3(x, y)$ associated with $s_3$;

$$w_3(x, y) = w_3^{R_j}(x, y), (x, y) \in R_j;$$

$$w_1^{R_1}(x, y)$$

is associated with $s_1$ in $R_1$, $$w_2^{R_1}(x, y)$$

is associated with $s_2$ in $R_1$, $$w_3^{R_1}(x, y)$$

is associated with $s_3$ in $R_1$, $$w_1^{R_2}(x, y)$$

is associated with $s_1$ in $R_2$, $$w_2^{R_2}(x, y)$$

is associated with $s_2$ in $R_2$, $$w_3^{R_2}(x, y)$$

is associated with $s_3$ in $R_2$;

$$w_1^{R_1}(x, y), w_2^{R_1}(x, y), \text{ and } w_3^{R_1}(x, y)$$

are constants; and $$w_1^{R_2}(x, y) \text{ and } w_2^{R_2}(x, y)$$

decrease with one of x and y, and $$w_3^{R_2}(x, y)$$

increases with the one of x and y.

9. The method of claim 1, wherein the plurality of intra prediction modes includes at least one angular prediction mode and at least one non-angular prediction mode;

$w_1(x, y)$ that is associated with the at least one angular prediction mode decreases towards one of a right direction and a bottom direction; and at least one weighting function of the plurality of weighting functions that is associated with the at least one non-angular prediction mode increases towards the one of the right direction and the bottom direction.

10. The method of claim 9, wherein the at least one angular prediction mode is an angular prediction mode, and the at least one non-angular prediction mode is a non-angular prediction mode;

$w_1(x, y)$ is proportional to $$C_1 \left(1 - \frac{x}{W}\right) \text{ or } C_1 \left(1 - \frac{y}{H}\right),$$

W and H being a width and a height of the current block, respectively;

when $w_1(x, y)$ is proportional to $$C_1 \left(1 - \frac{x}{W}\right),$$

the at least one weighting function associated with the non-angular prediction mode is $w_2(x, y)$ proportional to $$C_1 \left(1 - \frac{x}{W}\right);$$

and when $w_1(x, y)$ is proportional to $$C_1 \left(1 - \frac{y}{H}\right),$$

$w_2(x, y)$ is proportional to $$C_1 \left(\frac{y}{H}\right).$$

11. The method of claim 9, wherein the at least one angular prediction mode includes a first angular prediction mode and a second angular prediction mode, and the at least one non-angular prediction mode is a non-angular prediction mode;

$w_1(x, y)$ of the at least one weighting function associated with the first angular prediction mode is proportional to $$C_3 \left(1 - \frac{x}{W}\right) \text{ or } C_3 \left(1 - \frac{y}{H}\right),$$

W and H being a width and a height of the current block, respectively;

when $w_1(x, y)$ is proportional to $$C_3 \left(1 - \frac{x}{W}\right),$$

$w_2(x, y)$ of the at least one weighting function associated with the second angular prediction mode is proportional to $$C_4 \left(1 - \frac{x}{W}\right),$$

and a third weighting function $w_3(x, y)$ of the at least one weighting function associated with the non-angular prediction mode is proportional to $$C_5 \left(\frac{x}{W}\right);$$

and when $w_1(x, y)$ is proportional to $$C_3 \left(1 - \frac{y}{H}\right),$$

$w_2(x, y)$ is proportional to $$C_4 \left(1 - \frac{y}{H}\right),$$

and $w_3(x, y)$ is proportional to $$C_5 \left(\frac{y}{H}\right).$$

12. A method for video encoding, the method comprising:

determining a plurality of intra predictions of a current block based on a plurality of respective intra prediction modes;

determining a fused prediction of the current block based on a weighted summation of the plurality of intra predictions of the current block, the weighted summation being according to respective weights associated with the plurality of intra predictions, and encoding the current block based on the fused prediction, wherein each of the weights is based on a respective one of a plurality of weighting functions that depends on a sample location $(x, y)$ and the intra prediction mode of the intra prediction associated with the respective weight, the plurality of intra predictions includes a first intra prediction $s_1$ and a second intra prediction $s_2$, and the plurality of weighting functions includes a first weighting function $w_1(x, y)$ associated with the first intra prediction and a second weighting function $w_2(x, y)$ associated with the second intra prediction, $w_1(x, y)$ being different from $w_2(x, y)$.

13. The method of claim 12, wherein the current block is partitioned into subblocks;

subblock partition information of the current block indicates subblock locations and subblock shapes of the respective subblocks;

the respective one of the plurality of weighting functions is further based on the subblock partition information of the current block;

a weighting function $$w_i^{R_j}(x, y)$$

is associated with an ith intra prediction indicated by an index i and a jth subblock $R_j$ indicated by an index j in the subblocks, the index i being from 1 to k that is a number of the plurality of intra predictions, the index j being from 1 to L that is a number of the subblocks; and $$w_1(x, y) = w_1^{R_j}(x, y), (x, y) \in R_j \text{ and } w_2(x, y) = w_2^{R_j}(x, y), (x, y) \in R_j.$$

14. The method of claim 13, wherein the plurality of intra prediction modes includes a horizontal angular prediction mode and a vertical angular prediction mode;

$s_1$ is associated with the horizontal angular prediction mode and $s_2$ is associated with the vertical angular prediction mode, and k is 2;

the subblock partition information of the current block indicates that the current block is partitioned into a bottom-left triangular subblock $R_1$ and a top-right triangular subblock $R_2$, and L is 2;

$$w_1^{R_1}(x, y)$$

is associated with $s_1$ in $R_1$, $$w_2^{R_1}(x, y)$$

is associated with $s_2$ in $R_1$, $$w_1^{R_2}(x, y)$$

is associated with $s_1$ in $R_2$, and $$w_2^{R_2}(x, y)$$

is associated with $s_2$ in $R_2$;

$$w_1^{R_1}(x, y) > w_2^{R_1}(x, y); \text{ and}$$
$$w_1^{R_2}(x, y) < w_2^{R_2}(x, y).$$

15. The method of claim 13, wherein the plurality of intra prediction modes includes an angular prediction mode and a non-angular prediction mode;

$s_1$ is associated with the angular prediction mode and $s_2$ is associated with the non-angular prediction mode;

the subblock partition information of the current block indicates that the current block is partitioned into an L-shaped top-left subblock $R_1$ and a rectangular bottom-right subblock $R_2$;

$$w_1^{R1}(x, y)$$

is associated with $s_1$ in $R_1$, $$w_2^{R1}(x, y)$$

is associated with $s_2$ in $R_1$, $$w_1^{R2}(x, y)$$

is associated with $s_1$ in $R_2$, and $$w_2^{R2}(x, y)$$

is associated with $s_2$ in $R_2$;

$$w_1^{R1}(x, y) > w_2^{R1}(x, y); \text{ and}$$

$$w_1^{R2}(x, y) < w_2^{R1}(x, y).$$

16. The method of claim 13, wherein the plurality of intra prediction modes includes a horizontal angular prediction mode, a vertical angular prediction mode, and a non-angular prediction mode;

$s_1$ is associated with the horizontal angular prediction mode, $s_2$ is associated with the vertical angular prediction mode, and the plurality of intra predictions includes a third intra prediction $s_3$ associated with the non-angular prediction mode;

the subblock partition information of the current block indicates that the current block is partitioned into a left subblock $R_1$, a top subblock $R_2$, and a bottom-right subblock $R_3$, $R_1$ and $R_2$ being to the left of $R_3$ and above $R_3$, respectively;

the plurality of weighting functions includes a third weighting function $w_3(x, y)$ associated with $s_3$;

$$w_3(x, y) = w_3^{R_j}(x, y), (x, y) \in R_j;$$

$$w_1^{R1}(x, y)$$

is associated with $s_1$ in $R_1$, $$w_2^{R1}(x, y)$$

is associated with $s_2$ in $R_1$, $$w_3^{R1}(x, y)$$

is associated with $s_3$ in $R_1$, $$w_1^{R2}(x, y)$$

is associated with $S_1$ in $R_2$;

$$w_2^{R2}(x, y)$$

is associated with $s_2$ in $R_2$, $$w_3^{R2}(x, y)$$

is associated with $s_3$ in $R_2$, $$w_1^{R3}(x, y)$$

is associated with $s_1$ in $R_3$, $$w_2^{R3}(x, y)$$

is associated with $s_2$ in $R_3$, and $$w_3^{R3}(x, y)$$

is associated with $s_3$ in $R_3$;

$$w_1^{R1}(x, y) \text{ is larger than } w_2^{R1}(x, y) \text{ and } w_3^{R1}(x, y);$$

$$w_2^{R2}(x, y) \text{ is larger than } w_1^{R2}(x, y) \text{ and } w_3^{R2}(x, y); \text{ and}$$

$$w_3^{R3}(x, y) \text{ is larger than } w_1^{R3}(x, y) \text{ and } w_2^{R3}(x, y).$$

17. The method of claim 13, wherein the plurality of intra prediction modes includes a horizontal angular prediction mode, a vertical angular prediction mode, and a non-angular prediction mode;

$s_1$ is associated with the horizontal angular prediction mode, $s_2$ is associated with the vertical angular prediction mode, and the plurality of intra predictions includes a third intra prediction $s_3$ associated with the non-angular prediction mode;

the subblock partition information of the current block indicates that the current block is partitioned into a top-left subblock $R_1$, a bottom-left subblock $R_2$, a top-right subblock $R_3$, and a bottom-right subblock $R_4$;

the plurality of weighting functions includes a third weighting function $w_3(x, y)$ associated with $s_3$;

$$w_3(x, y) = w_3^{R_j}(x, y), (x, y) \in R_j;$$

$$w_1^{R1}(x, y)$$

is associated with $s_1$ in $R_1$, $$w_2^{R1}(x, y)$$

is associated with $s_2$ in $R_1$, $$w_3^{R1}(x, y)$$

is associated with $s_3$ in $R_1$, $$w_1^{R2}(x, y)$$

is associated with $s_1$ in $R_2$, $$w_2^{R2}(x, y)$$

is associated with $s_2$ in $R_2$, $$w_3^{R2}(x, y)$$

is associated with $s_3$ in $R_2$, $$w_1^{R3}(x, y)$$

is associated with $s_1$ in $R_3$;

$$w_2^{R3}(x, y)$$

is associated with $s_2$ in $R_3$, $$w_3^{R3}(x, y)$$

is associated with $s_3$ in $R_3$, $$w_1^{R4}(x, y)$$

is associated with $s_1$ in $R_4$, $$w_2^{R4}(x, y)$$

is associated with $s_2$ in $R_4$, and $$w_3^{R4}(x, y)$$

is associated with $s_3$ in $R_4$;

$$w_1^{R1}(x, y) = w_2^{R1}(x, y);$$
$$w_1^{R2}(x, y) \text{ is larger than } w_2^{R2}(x, y) \text{ and } w_3^{R2}(x, y);$$
$$w_2^{R3}(x, y) \text{ is larger than } w_1^{R3}(x, y) \text{ and } w_3^{R3}(x, y); \text{ and}$$
$$w_3^{R4}(x, y) \text{ is larger than } w_1^{R4}(x, y) \text{ and } w_2^{R4}(x, y).$$

18. The method of claim 13, wherein
the plurality of intra prediction modes includes an angular prediction mode and a non-angular prediction mode;
$s_1$ is associated with the angular prediction mode and $s_2$ is associated with the non-angular prediction mode;
the subblock partition information of the current block indicates that the current block is partitioned into an L-shaped top-left subblock $R_1$ and a rectangular bottom-right subblock $R_2$;

$$w_1^{R1}(x, y)$$

is associated with $s_1$ in $R_1$, $$w_2^{R1}(x, y)$$

is associated with $s_2$ in $R_1$, $$w_1^{R2}(x, y)$$

is associated with $s_1$ in $R_2$, and $$w_2^{R2}(x, y)$$

is associated with $s_2$ in $R_2$;

$$w_1^{R1}(x, y) = C_1;$$
$$w_2^{R1}(x, y) = C_2;$$
$$W_1^{R2}(x, y) \text{ is proportional to } C_3\left(1 - \frac{x}{w}\right) \text{ or } C_3\left(1 - \frac{y}{H}\right);$$

$$w_1^{R2}(x, y)$$

is proportional to $$C_3\left(\frac{x}{w}\right) \text{ when } w_1^{R2}(x, y)$$

is proportional to $$C_3\left(1 - \frac{x}{w}\right) \text{ and } w_2^{R2}(x, y)$$

is proportional to $$C_3\left(\frac{y}{H}\right) \text{ when } w_1^{R2}(x, y)$$

is proportional to $$C_3\left(1 - \frac{y}{H}\right);$$

and $C_1$, $C_2$ are $C_3$ are constants.

19. A non-transitory computer-readable storage medium storing instructions which when executed by a processor cause the processor to perform a method of encoding a bitstream comprising:

determining a plurality of intra predictions of a current block based on a plurality of respective intra prediction modes;

determining a fused prediction of the current block based on a weighted summation of the plurality of intra predictions of the current block, the weighted summation being according to respective weights associated with the plurality of intra predictions;

encoding, in the bitstream, the current block based on the fused prediction; and transmitting the bitstream, wherein each of the weights is based on a respective one of a plurality of weighting functions that depends on a sample location (x, y) and the intra prediction mode of the intra prediction associated with the respective weight, the plurality of intra predictions includes a first intra prediction $s_1$ and a second intra prediction $s_2$, and the plurality of weighting functions includes a first weighting function $w_1(x, y)$ associated with the first intra prediction and a second weighting function $w_2(x, y)$ associated with the second intra prediction, $w_1(x, y)$ being different from $w_2(x, y)$.

20. The method of claim 2, further comprising:

determining, for the ith intra prediction, the weighting function $$w_i^{Rj}(x, y)$$

for the jth subblock $R_j$ and a weighting function $$w_i^{Rj+1}(x, y)$$

for the (j+1)th subblock $R_{j+1}$ separately.

\*   \*   \*   \*   \*